US011858717B2

(12) United States Patent
Waltermire et al.

(10) Patent No.: US 11,858,717 B2
(45) Date of Patent: Jan. 2, 2024

(54) INSULATED BOX

(71) Applicant: Pratt Retail Specialties, LLC, Brookhaven, GA (US)

(72) Inventors: Jamie Waltermire, Peachtree City, GA (US); Paul Ott, Atlanta, GA (US); Greg Sollie, Sharpsburg, GA (US)

(73) Assignee: Pratt Retail Specialties, LLC, Brookhaven, GA (US)

( * ) Notice: Subject to any disclaimer, the term of this patent is extended or adjusted under 35 U.S.C. 154(b) by 0 days.

(21) Appl. No.: 17/127,050

(22) Filed: Dec. 18, 2020

(65) Prior Publication Data

US 2021/0101736 A1 Apr. 8, 2021

Related U.S. Application Data

(62) Division of application No. 15/590,349, filed on May 9, 2017, now Pat. No. 10,954,057.

(51) Int. Cl.

| | |
|---|---|
| ***B65D 81/38*** | (2006.01) |
| ***B65D 5/00*** | (2006.01) |
| ***B65D 1/24*** | (2006.01) |
| ***B65D 25/28*** | (2006.01) |
| ***B65D 5/24*** | (2006.01) |

(Continued)

(52) U.S. Cl.

CPC .......... *B65D 81/3858* (2013.01); *B31B 70/26* (2017.08); *B65D 1/24* (2013.01); *B65D 5/0065* (2013.01); *B65D 5/24* (2013.01); *B65D 25/287* (2013.01); *B65D 81/386* (2013.01); *B31B 50/26* (2017.08); *B31B 2120/501* (2017.08); *B65D 5/001* (2013.01); *B65D 11/1806* (2013.01);

(Continued)

(58) Field of Classification Search

CPC .... B65D 81/3858; B65D 1/24; B65D 25/287; B65D 81/386; B65D 5/001; B65D 11/1806

USPC .......... 206/545, 5

See application file for complete search history.

(56) References Cited

U.S. PATENT DOCUMENTS

| | | | |
|---|---|---|---|
| 265,985 | A | 10/1882 | Seabury |
| 1,061,531 | A | 5/1913 | Emmons |

(Continued)

FOREIGN PATENT DOCUMENTS

| | | |
|---|---|---|
| AU | 2021204424 | 7/2023 |
| CA | 2019104 | 12/1991 |

(Continued)

OTHER PUBLICATIONS

US 10,562,676 B2, 02/2020, Waltermire et al. (withdrawn)

(Continued)

*Primary Examiner* — Steven A. Reynolds

(74) *Attorney, Agent, or Firm* — Taylor English Duma LLP

(57) ABSTRACT

An insulated box assembly includes an insulated box, the insulated box including a box, the box including a bottom panel and a side panel, the side panel attached to the bottom panel, the box defining a box cavity; and an insulated panel attached to the side panel, the insulated panel including an insulation batt and a sheet, the insulation batt enclosed between the side panel and the sheet; and an insulated cavity panel, the insulated cavity panel disposed within the box cavity, the insulated cavity panel including a cavity sheet and a cavity insulation batt, the cavity sheet encapsulating the cavity insulation batt.

5 Claims, 12 Drawing Sheets

(51) Int. Cl.

| | |
|---|---|
| ***B31B 70/26*** | (2017.01) |
| *B65D 6/18* | (2006.01) |
| *B31B 50/26* | (2017.01) |
| *B31B 120/50* | (2017.01) |

(52) U.S. Cl.
CPC .... *B65D 81/3848* (2013.01); *B65D 2525/281* (2013.01)

(56) References Cited

U.S. PATENT DOCUMENTS 1,150,105 A 8/1915 Emmons
1,527,167 A 2/1925 Birdseye
1,677,565 A 7/1928 Oppenheim
1,682,410 A 8/1928 Oppenheim
1,747,980 A 2/1930 Kondolf
1,753,813 A 4/1930 Washburn
1,868,996 A 7/1932 Sharp
1,896,393 A 2/1933 Devine
1,899,892 A 2/1933 D'Este et al.
1,930,680 A 10/1933 Hinton
1,935,923 A 11/1933 Thoke
1,937,263 A 11/1933 Bubb
1,942,917 A 1/1934 D'Este et al.
1,954,013 A 4/1934 Lilienfield
2,018,519 A 10/1935 Hall
2,070,747 A 2/1937 Ostrom
2,116,513 A 5/1938 Frankenstein
2,148,454 A 2/1939 Gerard
2,165,327 A 7/1939 Zalkind
2,289,060 A 7/1942 Merkle
2,293,361 A 8/1942 Roberts
2,326,817 A 8/1943 Zalkind
2,360,806 A 10/1944 Van Rosen
2,386,905 A 10/1945 Meitzen
2,389,601 A 11/1945 De Witt
2,485,643 A 10/1949 Norquist
2,554,004 A 5/1951 Bergstein
2,632,311 A 3/1953 Sullivan
2,650,016 A 8/1953 McMillan
2,753,102 A 7/1956 Paige
2,867,035 A 1/1959 Patterson, Jr.
2,899,103 A 8/1959 Ebert
2,927,720 A 3/1960 Adams
2,950,225 A 8/1960 Losse
2,986,324 A 5/1961 Anderson, Jr.
2,987,239 A 6/1961 Atwood
3,003,680 A * 10/1961 Wilcox, Jr. .......... B65D 5/3628 229/117.06
3,029,008 A 4/1962 Membrino
3,031,121 A 4/1962 Chase
3,065,895 A 11/1962 Lipschutz
3,096,879 A 7/1963 Schumacher
3,097,782 A 7/1963 Koropatkin et al.
3,182,913 A 5/1965 Brian
3,193,176 A 7/1965 Gullickson et al.
3,194,471 A 7/1965 Murphy
3,206,103 A 9/1965 Bixler
3,222,843 A 12/1965 Schneider
3,236,206 A 2/1966 Willinger
3,282,411 A 11/1966 Jardine
3,286,825 A 11/1966 Laas
3,335,941 A 8/1967 Gatward
3,349,984 A 10/1967 Halko, Jr.
3,371,462 A 3/1968 Nordkvist et al.
3,375,934 A 4/1968 Bates
3,399,818 A 9/1968 Stegner
3,420,363 A 1/1969 Blickensderfer
3,435,736 A 4/1969 Reiche
3,465,948 A 9/1969 Boyer
3,503,550 A 3/1970 Main et al.
3,551,945 A 1/1971 Eyberg et al.
3,670,948 A 6/1972 Berg
3,703,383 A 11/1972 Kuchenbecker
3,734,336 A 5/1973 Rankow et al.
3,736,221 A 5/1973 Evers et al.
3,747,743 A 7/1973 Hoffman, Jr.
3,749,299 A 7/1973 Ingle
3,836,044 A 9/1974 Tilp et al.
3,843,038 A 10/1974 Sax
3,880,341 A 4/1975 Bamburg et al.
3,883,065 A 5/1975 Presnick
3,887,743 A 6/1975 Lane
3,890,762 A 6/1975 Ernst et al.
3,919,372 A 11/1975 Vogele
3,945,561 A 3/1976 Strebelle
3,976,605 A 8/1976 Matsunaga et al.
3,980,005 A 9/1976 Buonaiuto
4,030,227 A 6/1977 Oftedahl
4,050,264 A 9/1977 Tanaka
4,068,779 A 1/1978 Canfield
4,091,852 A 5/1978 Jordan et al.
4,146,660 A 3/1979 Hall et al.
4,169,540 A 10/1979 Larsson et al.
4,170,304 A 10/1979 Huke
4,211,267 A 7/1980 Skovgaard
4,213,310 A 7/1980 Buss
4,335,844 A 6/1982 Egli
4,342,416 A 8/1982 Philips
4,351,165 A 9/1982 Gottsegen et al.
4,380,314 A 4/1983 Langston, Jr. et al.
D270,041 S 8/1983 Vestal
4,396,144 A 8/1983 Gutierrez et al.
4,418,864 A 12/1983 Neilsen
4,488,623 A 12/1984 Linnell, II et al.
4,509,645 A 4/1985 Hotta
4,679,242 A 7/1987 Brockhaus
4,682,708 A 7/1987 Pool
4,711,390 A 12/1987 Andrews et al.
4,797,010 A 1/1989 Coelho
4,819,793 A 4/1989 Willard et al.
4,828,133 A 5/1989 Hougendobler
4,830,282 A 5/1989 Knight, Jr.
4,889,252 A 12/1989 Rockom et al.
4,930,903 A 6/1990 Mahoney
4,989,780 A 2/1991 Foote et al.
5,016,813 A 5/1991 Simons
5,020,481 A 6/1991 Nelson
5,062,527 A 11/1991 Westerman
5,094,547 A 3/1992 Graham
5,102,004 A 4/1992 Hollander et al.
5,154,309 A 10/1992 Wischusen, III et al.
5,158,371 A 10/1992 Moravek
5,165,583 A 11/1992 Kouwenberg
5,185,904 A 2/1993 Rogers et al.
5,226,542 A 7/1993 Boecker et al.
5,230,450 A 7/1993 Mahvi et al.
5,263,339 A 11/1993 Evans
5,358,757 A 10/1994 Robinette et al.
5,372,429 A 12/1994 Beaver, Jr. et al.
5,417,342 A 5/1995 Hutchison
5,418,031 A 5/1995 English
5,441,170 A 8/1995 Bane, III
5,454,471 A 10/1995 Norvell
5,460,324 A 10/1995 Vinther
5,491,186 A 2/1996 Kean et al.
5,493,874 A 2/1996 Landgrebe
5,499,473 A 3/1996 Ramberg
5,505,810 A 4/1996 Kirby et al.
5,507,429 A 4/1996 Arlin
5,511,667 A 4/1996 Carder
5,512,345 A 4/1996 Tsutsumi et al.
5,516,580 A 5/1996 Frenette et al.
5,562,228 A 10/1996 Ericson
5,573,119 A 11/1996 Luray
5,596,880 A 1/1997 Welker et al.
5,601,232 A 2/1997 Greenlee
5,613,610 A 3/1997 Bradford
5,615,795 A 4/1997 Tipps
5,638,978 A 6/1997 Cadiente
5,775,576 A 7/1998 Stone
5,842,571 A 12/1998 Rausch
5,906,290 A * 5/1999 Haberkorn ......... B65D 81/3886 190/110

(56) References Cited

U.S. PATENT DOCUMENTS 5,996,366 A 12/1999 Renard
6,003,719 A 12/1999 Steward, III
D421,457 S 3/2000 Crofton
6,041,958 A 3/2000 Tremelo
6,048,099 A 4/2000 Muffett et al.
6,050,410 A 4/2000 Quirion
6,050,412 A 4/2000 Clough et al.
6,090,027 A 7/2000 Brinkman
6,138,902 A 10/2000 Welch
6,164,526 A 12/2000 Dalvey
6,168,040 B1 1/2001 Sautner et al.
6,220,473 B1 4/2001 Ehman et al.
6,223,551 B1 5/2001 Mitchell
6,238,091 B1 5/2001 Mogil
6,244,458 B1 6/2001 Frysinger et al.
6,247,328 B1 6/2001 Mogil
6,295,830 B1 10/2001 Newman
6,295,860 B1 10/2001 Sakairi et al.
6,296,134 B1 10/2001 Cardinale
6,308,850 B1 10/2001 Coom et al.
6,325,281 B1 12/2001 Grogan
6,364,199 B1 4/2002 Rose
6,443,309 B1 * 9/2002 Becker .................... B65D 5/60 220/592.2
6,453,682 B1 9/2002 Jennings et al.
6,478,268 B1 11/2002 Bidwell et al.
6,510,705 B1 1/2003 Jackson
6,582,124 B2 6/2003 Mogil
6,598,783 B2 7/2003 Brinkman
6,618,868 B2 9/2003 Minnick
6,688,133 B1 2/2004 Donefrio
6,725,783 B2 4/2004 Sekino
6,726,017 B2 4/2004 Maresh et al.
6,736,309 B1 5/2004 Westerman et al.
6,771,183 B2 8/2004 Hunter
6,821,019 B2 11/2004 Mogil
6,837,420 B2 1/2005 Westerman et al.
6,868,982 B2 3/2005 Gordon
6,875,486 B2 4/2005 Miller
6,899,229 B2 5/2005 Dennison et al.
6,910,582 B2 6/2005 Lantz
6,913,389 B2 7/2005 Kannankeril et al.
6,971,539 B1 12/2005 Abbe
7,000,962 B2 2/2006 Le
7,019,271 B2 3/2006 Wnek et al.
7,070,841 B2 7/2006 Benim et al.
7,094,192 B2 8/2006 Schoenberger et al.
7,140,773 B2 11/2006 Becker et al.
D534,797 S 1/2007 El-Afandi
D545,189 S 6/2007 El-Afandi
7,225,632 B2 6/2007 Derifield
7,225,970 B2 6/2007 Philips
7,229,677 B2 6/2007 Miller
D546,679 S 7/2007 El-Afandi
7,255,261 B2 8/2007 Mesly
7,264,147 B1 9/2007 Benson et al.
7,270,358 B2 * 9/2007 Hirsch ..................... A45F 3/14 294/157
7,392,931 B2 7/2008 Issler
7,452,316 B2 11/2008 Cals et al.
D582,676 S 12/2008 Rothschild
7,484,623 B2 2/2009 Goodrich
7,487,904 B2 2/2009 McClure
7,597,209 B2 10/2009 Rothschild et al.
7,607,563 B2 10/2009 Hanna et al.
7,677,406 B2 3/2010 Maxson
7,681,405 B2 3/2010 Williams
7,784,301 B2 8/2010 Sasaki et al.
7,807,773 B2 10/2010 Matsuoka et al.
7,841,512 B2 11/2010 Westerman et al.
7,845,508 B2 12/2010 Rothschild et al.
7,870,992 B2 1/2011 Schille et al.
7,909,806 B2 3/2011 Goodman et al.
7,971,720 B2 7/2011 Minkler
8,118,177 B2 2/2012 Drapela et al.
8,209,995 B2 7/2012 Kieling et al.
8,210,353 B2 7/2012 Epicureo
8,343,024 B1 1/2013 Contanzo, Jr. et al.
8,365,943 B2 2/2013 Bentley
8,465,404 B2 6/2013 Hadley
8,567,662 B2 10/2013 Costanzo, Jr.
8,579,183 B2 11/2013 Belfort et al.
8,596,520 B2 12/2013 Scott
8,613,202 B2 12/2013 Williams
8,651,593 B2 2/2014 Bezich et al.
8,763,811 B2 7/2014 Lantz
8,763,886 B2 7/2014 Hall
D710,692 S 8/2014 Genender
8,795,470 B2 8/2014 Henderson et al.
8,875,885 B2 * 11/2014 Padden ................. B65D 65/44 206/593
8,875,983 B2 11/2014 Enhard et al.
8,919,082 B1 12/2014 Cataldo
8,960,528 B2 2/2015 Sadlier
9,272,475 B2 3/2016 Ranade et al.
9,290,313 B2 3/2016 De Lesseux et al.
9,322,136 B2 4/2016 Ostendorf et al.
D758,182 S 6/2016 Sponselee
9,394,633 B2 7/2016 Shimotsu et al.
D764,903 S 8/2016 Sanfilippo et al.
9,408,445 B2 8/2016 Mogil et al.
9,429,350 B2 8/2016 Chapman, Jr.
9,499,294 B1 11/2016 Contanzo, Jr.
9,550,618 B1 1/2017 Jobe
9,605,382 B2 3/2017 Virtanen
9,611,067 B2 4/2017 Collison
9,635,916 B2 5/2017 Bezich et al.
9,701,437 B2 7/2017 Bugas et al.
9,738,420 B2 8/2017 Miller
9,738,432 B1 8/2017 Petrucci et al.
9,834,366 B2 12/2017 Giuliani
9,908,680 B2 3/2018 Shi et al.
9,908,684 B2 3/2018 Collison
9,920,517 B2 3/2018 Sollie et al.
9,950,830 B2 4/2018 De Lesseux et al.
9,981,797 B2 5/2018 Aksan et al.
10,046,901 B1 8/2018 Jobe
10,094,126 B2 10/2018 Collison et al.
10,112,756 B2 10/2018 Menzel, Jr.
10,226,909 B2 3/2019 Frem et al.
10,266,332 B2 4/2019 Aksan et al.
10,273,073 B2 4/2019 Collison
10,357,936 B1 7/2019 Vincent et al.
10,392,156 B2 8/2019 McDonald et al.
10,435,194 B2 10/2019 Sollie et al.
10,442,600 B2 10/2019 Waltermire et al.
10,507,968 B2 12/2019 Sollie et al.
10,551,110 B2 2/2020 Waltermire et al.
10,583,977 B2 3/2020 Collison et al.
10,604,304 B2 3/2020 Waltermire et al.
D881,690 S 4/2020 Smalley
10,661,941 B2 5/2020 Genender et al.
10,800,595 B2 10/2020 Waltermire et al.
10,843,840 B2 11/2020 Sollie et al.
10,858,141 B2 12/2020 Sollie et al.
10,882,681 B2 1/2021 Waltermire et al.
10,882,682 B2 1/2021 Collison et al.
10,882,683 B2 1/2021 Collison et al.
10,882,684 B2 1/2021 Sollie et al.
10,926,939 B2 2/2021 Collison et al.
10,941,977 B2 3/2021 Waltermire et al.
10,947,025 B2 3/2021 Sollie et al.
10,954,057 B2 3/2021 Waltermire et al.
10,954,058 B2 3/2021 Sollie et al.
11,027,875 B2 6/2021 Sollie et al.
11,059,652 B2 7/2021 Sollie et al.
11,066,228 B2 7/2021 Sollie et al.
11,117,731 B2 9/2021 Waltermire et al.
11,124,354 B2 9/2021 Waltermire et al.
D934,064 S 10/2021 Satnick
11,137,198 B2 10/2021 Waltermire et al.
11,148,870 B2 10/2021 Collison et al.
11,203,458 B2 12/2021 Sollie et al.
11,214,427 B2 1/2022 Collison et al.

(56) References Cited

U.S. PATENT DOCUMENTS 11,215,393 B2 1/2022 Waltermire et al.
11,230,404 B2 1/2022 Sollie et al.
11,247,806 B2 2/2022 Sollie et al.
11,247,827 B2 2/2022 Jobe
11,255,596 B2 2/2022 Waltermire et al.
11,261,017 B2 3/2022 Waltermire et al.
11,267,641 B2 3/2022 Collison et al.
11,286,099 B2 3/2022 Sollie et al.
11,312,563 B2 4/2022 Smith
11,325,772 B2 5/2022 Sollie et al.
D955,876 S 6/2022 Sill et al.
D957,246 S 7/2022 Culler et al.
D957,936 S 7/2022 Lincoln
D968,950 S 11/2022 Sollie et al.
11,485,566 B2 11/2022 Waltermire et al.
11,524,832 B2 12/2022 Sollie et al.
11,542,092 B2 1/2023 Sollie et al.
11,565,871 B2 1/2023 Waltermire et al.
11,618,608 B2 4/2023 Sollie et al.
11,623,783 B2 4/2023 Sollie et al.
11,628,978 B2 4/2023 Waltermire et al.
11,634,265 B2 4/2023 Collison et al.
11,679,925 B2 6/2023 Sollie et al.
11,692,762 B2 7/2023 Waltermire et al.
11,697,542 B2 7/2023 Sollie et al.
11,713,180 B2 8/2023 Sollie et al.
11,718,464 B2 8/2023 Sollie et al.
11,724,851 B2 8/2023 Sollie et al.
11,780,635 B2 10/2023 Sollie et al.
11,780,636 B2 10/2023 Sollie et al.
11,780,666 B2 10/2023 Collison et al.
2001/0010312 A1 8/2001 Mogil
2002/0020188 A1 2/2002 Sharon et al.
2002/0064318 A1 5/2002 Malone et al.
2002/0134698 A1 9/2002 Rhodes et al.
2002/0162767 A1 11/2002 Ohtsubo
2003/0099833 A1 5/2003 Erb, Jr. et al.
2003/0145561 A1 8/2003 Cals et al.
2004/0004111 A1 1/2004 Cardinale
2004/0031842 A1 2/2004 Westerman et al.
2004/0079794 A1 4/2004 Mayer
2004/0164132 A1 8/2004 Kuester
2005/0109655 A1 5/2005 Vershum et al.
2005/0117817 A1 6/2005 Mogil et al.
2005/0189404 A1 9/2005 Xiaohai et al.
2005/0214512 A1 9/2005 Fascio
2005/0224501 A1 10/2005 Folkert et al.
2005/0279963 A1 12/2005 Church et al.
2006/0053828 A1 3/2006 Shallman et al.
2006/0078720 A1 4/2006 Toas et al.
2006/0096978 A1 5/2006 Lafferty et al.
2006/0193541 A1 8/2006 Norcom
2006/0243784 A1 11/2006 Glaser et al.
2007/0000932 A1 1/2007 Cron et al.
2007/0000983 A1 1/2007 Spurrell et al.
2007/0051782 A1 3/2007 Lantz
2007/0151685 A1 7/2007 Horsfield et al.
2007/0193298 A1 8/2007 Derifield
2007/0209307 A1 9/2007 Andersen
2007/0257040 A1 11/2007 Price, Jr. et al.
2008/0095959 A1 4/2008 Warner et al.
2008/0135564 A1 6/2008 Romero
2008/0173703 A1 7/2008 Westerman et al.
2008/0190940 A1 8/2008 Scott
2008/0203090 A1 8/2008 Dickinson
2008/0289302 A1 11/2008 Vulpitta
2008/0296356 A1 12/2008 Hatcher et al.
2008/0308616 A1 12/2008 Phung
2008/0314794 A1 12/2008 Bowman
2009/0034883 A1 2/2009 Giuliani
2009/0114311 A1 5/2009 McDowell
2009/0193765 A1 8/2009 Lantz
2009/0214142 A1 8/2009 Bossel et al.
2009/0283578 A1 11/2009 Miller
2009/0288791 A1 11/2009 Hammer et al.
2010/0001056 A1 1/2010 Chandaria
2010/0006630 A1 1/2010 Humphries et al.
2010/0062921 A1 3/2010 Veiseh
2010/0072105 A1* 3/2010 Glaser .................. B65D 5/5035 206/593
2010/0109196 A1 5/2010 Al-Sabih et al.
2010/0139878 A1 6/2010 Clemente
2010/0140124 A1 6/2010 Hafner
2010/0151164 A1 6/2010 Grant et al.
2010/0168260 A1 7/2010 Frenzel et al.
2010/0219232 A1* 9/2010 Smith .................... B65D 5/029 229/199
2010/0258574 A1 10/2010 Bentley
2010/0270317 A1 10/2010 Kieling et al.
2010/0282827 A1 11/2010 Padovani
2010/0284634 A1 11/2010 Hadley
2010/0314397 A1 12/2010 Williams et al.
2010/0314437 A1 12/2010 Dowd
2011/0042388 A1 2/2011 Tristancho Tello
2011/0042449 A1 2/2011 Copenhaver et al.
2011/0100868 A1 5/2011 Lantz
2011/0114513 A1 5/2011 Miller
2011/0235950 A1 9/2011 Lin
2011/0240515 A1 10/2011 Ridgeway
2011/0284556 A1 11/2011 Palmer et al.
2011/0311758 A1 12/2011 Burns et al.
2011/0317944 A1 12/2011 Liu
2012/0031957 A1* 2/2012 Whitaker ............... B65D 5/566 428/116
2012/0074823 A1 3/2012 Bezich et al.
2012/0145568 A1 6/2012 Collison et al.
2012/0243808 A1 9/2012 De Lesseux et al.
2012/0248101 A1 10/2012 Tumber et al.
2012/0251818 A1 10/2012 Axrup et al.
2012/0279896 A1 11/2012 Lantz
2012/0328807 A1 12/2012 Grimes
2013/0017349 A1 1/2013 Heiskanen et al.
2013/0026215 A1 1/2013 Enhard et al.
2013/0112694 A1 5/2013 Bentley
2013/0112695 A1 5/2013 Hall
2013/0140317 A1 6/2013 Roskoss
2014/0000306 A1 1/2014 Chapman, Jr.
2014/0021208 A1 1/2014 Anti et al.
2014/0093697 A1 4/2014 Perry et al.
2014/0248003 A1 9/2014 Mogil et al.
2014/0272163 A1 9/2014 Tilton
2014/0274633 A1 9/2014 Tilton
2014/0300026 A1 10/2014 Taccolini
2014/0319018 A1 10/2014 Collison
2014/0367393 A1 12/2014 Ranade
2015/0110423 A1 4/2015 Fox et al.
2015/0111011 A1 4/2015 Hoekstra et al.
2015/0166244 A1 6/2015 Wood et al.
2015/0175338 A1 6/2015 Culp et al.
2015/0238033 A1 8/2015 Zavitsanos
2015/0239639 A1 8/2015 Wenner et al.
2015/0255009 A1 9/2015 Akhter et al.
2015/0259126 A1* 9/2015 McGoff ............. B65D 81/3834 220/592.2
2015/0284131 A1 10/2015 Genender et al.
2015/0345853 A1 12/2015 Deyen
2015/0367981 A1 12/2015 Moore
2016/0015039 A1 1/2016 Pierce
2016/0052696 A1 2/2016 Cook et al.
2016/0060017 A1 3/2016 De Lesseux et al.
2016/0264294 A1 9/2016 Bacon
2016/0304267 A1 10/2016 Aksan
2016/0318648 A1 11/2016 Kuninobu
2016/0325915 A1 11/2016 Aksan
2017/0015080 A1 1/2017 Collison et al.
2017/0021961 A1 1/2017 Humphrey et al.
2017/0043937 A1 2/2017 Lantz
2017/0121052 A1 5/2017 Morimoto
2017/0144792 A1 5/2017 Block
2017/0198959 A1 7/2017 Morris
2017/0225870 A1 8/2017 Collison
2017/0233134 A9 8/2017 Grajales et al.
2017/0233165 A1 8/2017 Kuhn
2017/0283157 A1 10/2017 Jobe

(56) References Cited

U.S. PATENT DOCUMENTS

| | | | |
|---|---|---|---|
| 2017/0305639 | A1 | 10/2017 | Kuhn et al. |
| 2017/0320653 | A1 | 11/2017 | Mogil et al. |
| 2017/0334622 | A1 | 11/2017 | Menzel, Jr. |
| 2017/0341847 | A1 | 11/2017 | Chase et al. |
| 2017/0361973 | A1 | 12/2017 | Padilla |
| 2017/0369226 | A1 | 12/2017 | Chase et al. |
| 2018/0050857 | A1 | 2/2018 | Collison |
| 2018/0051460 | A1 | 2/2018 | Sollie et al. |
| 2018/0086539 | A1 | 3/2018 | Aksan et al. |
| 2018/0148245 | A1 | 5/2018 | Aggarwal et al. |
| 2018/0148246 | A1 | 5/2018 | Fu et al. |
| 2018/0194534 | A1 | 7/2018 | Jobe |
| 2018/0215525 | A1 | 8/2018 | Vogel et al. |
| 2018/0229917 | A1 | 8/2018 | Jobe |
| 2018/0237207 | A1 | 8/2018 | Aksan et al. |
| 2018/0274837 | A1 | 9/2018 | Christensen |
| 2018/0290813 | A1 | 10/2018 | Waltermire et al. |
| 2018/0290815 | A1 | 10/2018 | Waltermire et al. |
| 2018/0299059 | A1 | 10/2018 | McGoff et al. |
| 2018/0319569 | A1 | 11/2018 | McGoff et al. |
| 2018/0327171 | A1 | 11/2018 | Waltermire et al. |
| 2018/0327172 | A1 | 11/2018 | Waltermire et al. |
| 2018/0334308 | A1 | 11/2018 | Moore et al. |
| 2018/0335241 | A1 | 11/2018 | Li et al. |
| 2019/0009946 | A1 | 1/2019 | Nixon et al. |
| 2019/0032991 | A1 | 1/2019 | Waltermire et al. |
| 2019/0047775 | A1 | 2/2019 | Waltermire et al. |
| 2019/0144155 | A1 | 5/2019 | Geng et al. |
| 2019/0185246 | A1 | 6/2019 | Sollie et al. |
| 2019/0185247 | A1 | 6/2019 | Sollie et al. |
| 2019/0193916 | A1 | 6/2019 | Waltermire et al. |
| 2019/0210790 | A1 | 7/2019 | Rizzo et al. |
| 2019/0234679 | A1 | 8/2019 | Waltermire et al. |
| 2019/0248573 | A1 | 8/2019 | Collison et al. |
| 2019/0270572 | A1 | 9/2019 | Collison et al. |
| 2019/0270573 | A1 | 9/2019 | Collison et al. |
| 2019/0352075 | A1 | 11/2019 | Waltermire et al. |
| 2019/0352076 | A1 | 11/2019 | Waltermire et al. |
| 2019/0352080 | A1 | 11/2019 | Waltermire et al. |
| 2019/0359412 | A1 | 11/2019 | Sollie et al. |
| 2019/0359413 | A1 | 11/2019 | Sollie et al. |
| 2019/0359414 | A1 | 11/2019 | Sollie et al. |
| 2019/0367208 | A1 | 12/2019 | Jobe |
| 2019/0367209 | A1 | 12/2019 | Jobe |
| 2019/0376636 | A1 | 12/2019 | Fellinger et al. |
| 2019/0382186 | A1 | 12/2019 | Sollie et al. |
| 2019/0390892 | A1 | 12/2019 | Waltermire et al. |
| 2020/0071056 | A1 | 3/2020 | Henderson et al. |
| 2020/0088458 | A1 | 3/2020 | Waltermire et al. |
| 2020/0103159 | A1 | 4/2020 | Waltermire et al. |
| 2020/0122896 | A1 | 4/2020 | Waltermire et al. |
| 2020/0148409 | A1 | 5/2020 | Sollie et al. |
| 2020/0148410 | A1 | 5/2020 | Sollie et al. |
| 2020/0148452 | A1 | 5/2020 | Sollie et al. |
| 2020/0148453 | A1 | 5/2020 | Sollie et al. |
| 2020/0283188 | A1 | 9/2020 | Sollie et al. |
| 2020/0346816 | A1 | 11/2020 | Sollie et al. |
| 2020/0346841 | A1 | 11/2020 | Sollie et al. |
| 2021/0039869 | A1 | 2/2021 | Sollie et al. |
| 2021/0039870 | A1 | 2/2021 | Sollie et al. |
| 2021/0039871 | A1 | 2/2021 | Sollie et al. |
| 2021/0070527 | A1 | 3/2021 | Sollie et al. |
| 2021/0070529 | A1 | 3/2021 | Sollie et al. |
| 2021/0070530 | A1 | 3/2021 | Sollie et al. |
| 2021/0078755 | A1 | 3/2021 | Sollie et al. |
| 2021/0101734 | A1 | 4/2021 | Collison et al. |
| 2021/0101735 | A1 | 4/2021 | Collison et al. |
| 2021/0101737 | A1 | 4/2021 | Waltermire et al. |
| 2021/0102746 | A1 | 4/2021 | Waltermire et al. |
| 2021/0155365 | A1 | 5/2021 | Sollie et al. |
| 2021/0155367 | A1 | 5/2021 | Sollie et al. |
| 2021/0163210 | A1 | 6/2021 | Waltermire et al. |
| 2021/0179313 | A1 | 6/2021 | Sollie et al. |
| 2021/0179337 | A1 | 6/2021 | Sollie et al. |
| 2021/0347553 | A1 | 11/2021 | Sollie et al. |
| 2022/0017260 | A1 | 1/2022 | Sollie et al. |
| 2022/0024634 | A1 | 1/2022 | Sollie et al. |
| 2022/0024635 | A1 | 1/2022 | Sollie et al. |
| 2022/0026140 | A1 | 1/2022 | Waltermire et al. |
| 2022/0026141 | A1 | 1/2022 | Waltermire et al. |
| 2022/0033167 | A1 | 2/2022 | Collison et al. |
| 2022/0081152 | A1 | 3/2022 | Sollie et al. |
| 2022/0081186 | A1 | 3/2022 | Waltermire et al. |
| 2022/0177216 | A1 | 6/2022 | Sollie et al. |
| 2022/0185533 | A1 | 6/2022 | Chen et al. |
| 2022/0242607 | A1 | 8/2022 | Sollie et al. |
| 2022/0251783 | A1 | 8/2022 | Anagnostopoulos et al. |
| 2022/0288870 | A1 | 9/2022 | Collison et al. |
| 2022/0297918 | A1 | 9/2022 | Collison et al. |
| 2022/0388755 | A1 | 12/2022 | Waltermire et al. |
| 2022/0411167 | A1 | 12/2022 | Sollie et al. |
| 2023/0125191 | A1 | 4/2023 | Waltermire et al. |
| 2023/0159213 | A1 | 5/2023 | Sollie et al. |
| 2023/0159214 | A1 | 5/2023 | Sollie et al. |
| 2023/0182990 | A1 | 6/2023 | Sollie et al. |
| 2023/0227210 | A1 | 7/2023 | Waltermire et al. |
| 2023/0257157 | A1 | 8/2023 | Sollie et al. |
| 2023/0280087 | A1 | 9/2023 | Waltermire et al. |
| 2023/0322466 | A1 | 10/2023 | Sollie et al. |
| 2023/0322467 | A1 | 10/2023 | Sollie et al. |
| 2023/0322468 | A1 | 10/2023 | Sollie et al. |

FOREIGN PATENT DOCUMENTS

| | | |
|---|---|---|
| CA | 2145953 | 10/1996 |
| CA | 2149939 | 11/1996 |
| CN | 1073993 | 7/1993 |
| CN | 1503962 | 6/2004 |
| CN | 102264961 | 11/2011 |
| CN | 206494316 | 9/2017 |
| CN | 108001787 | 5/2018 |
| DE | 1897846 | 7/1964 |
| DE | 102011016500 | 10/2012 |
| DE | 202017103230 | 7/2017 |
| DE | 202017003908 | 10/2017 |
| DE | 202018101998 | 7/2019 |
| DE | 202019003407 | 11/2019 |
| EP | 0133539 | 2/1985 |
| EP | 0537058 | 4/1993 |
| EP | 2781652 | 12/2015 |
| EP | 2990196 | 3/2016 |
| EP | 3144248 | 3/2017 |
| EP | 3348493 | 7/2018 |
| EP | 3538708 | 1/2022 |
| FR | 1241878 | 7/1960 |
| FR | 2705317 | 11/1994 |
| FR | 2820718 | 8/2002 |
| FR | 2821786 | 9/2002 |
| FR | 3016352 | 7/2015 |
| GB | 217683 | 6/1924 |
| GB | 235673 | 6/1925 |
| GB | 528289 | 1/1940 |
| GB | 713640 | 8/1954 |
| GB | 1204058 | 9/1970 |
| GB | 1305212 | 1/1973 |
| GB | 1372054 | 10/1974 |
| GB | 2400096 | 5/2006 |
| GB | 2516490 | 1/2015 |
| GB | 2528289 | 1/2016 |
| JP | 01254557 | 10/1989 |
| JP | 2005139582 | 6/2005 |
| JP | 2005247329 | 9/2005 |
| JP | 2005247329 | 7/2012 |
| KR | 101730461 | 4/2017 |
| WO | 8807476 | 10/1988 |
| WO | 9726192 | 7/1997 |
| WO | 9932374 | 7/1999 |
| WO | 2001070592 | 9/2001 |
| WO | 2009026256 | 2/2009 |
| WO | 2014147425 | 9/2014 |
| WO | 2016187435 | 5/2016 |
| WO | 2016187435 | 11/2016 |
| WO | 2017207974 | 12/2017 |
| WO | 2018089365 | 5/2018 |

(56) References Cited

FOREIGN PATENT DOCUMENTS

| | | |
|---|---|---|
| WO | 2018093586 | 5/2018 |
| WO | 2018227047 | 12/2018 |
| WO | 2019113453 | 6/2019 |
| WO | 2019125904 | 6/2019 |
| WO | 2019125906 | 6/2019 |
| WO | 2019226199 | 11/2019 |
| WO | 2020011587 | 1/2020 |
| WO | 2020101939 | 5/2020 |
| WO | 2020102023 | 5/2020 |
| WO | 2020122921 | 6/2020 |
| WO | 2020222943 | 11/2020 |

OTHER PUBLICATIONS

US 10,899,530 B2, 01/2021, Sollie et al. (withdrawn)
US 10,899,531 B2, 01/2021, Sollie et al. (withdrawn)
US 11,027,908 B2, 06/2021, Sollie et al. (withdrawn)
US 11,040,817 B2, 06/2021, Sollie et al. (withdrawn)
US 11,072,486 B2, 07/2021, Waltermire et al. (withdrawn)
US 11,079,168 B2, 08/2021, Waltermire et al. (withdrawn)
US 11,084,644 B2, 08/2021, Waltermire et al. (withdrawn)
US 11,167,877 B2, 11/2021, Sollie et al. (withdrawn)
US 11,167,878 B2, 11/2021, Sollie et al. (withdrawn)
US 11,247,836 B2, 02/2022, Sollie et al. (withdrawn)
US 11,292,656 B2, 04/2022, Sollie et al. (withdrawn)
US D959,977 S, 08/2022, Sollie et al. (withdrawn)
US 11,479,403 B2, 10/2022, Sollie et al. (withdrawn)
US 11,498,745 B2, 11/2022, Sollie et al. (withdrawn)
US 11,591,131 B2, 02/2023, Sollie et al. (withdrawn)
US 11,591,132 B2, 02/2023, Sollie et al. (withdrawn)
US 11,603,253 B2, 03/2023, Collison et al. (withdrawn)
US 11,613,421 B2, 03/2023, Sollie et al. (withdrawn)

Feb. 5, 2021, Waltermire, Jamie; Non-Final Office Action for U.S. Appl. No. 16/293,716, filed Mar. 6, 2019, dated Feb. 5, 2021, 18 pgs.

Feb. 5, 2021, Waltermire, Jamie; Corrected Notice of Allowance for U.S. Appl. No. 16/561,203, filed Sep. 5, 2019, dated Feb. 5, 2021, 8 pgs.

Feb. 3, 2021, Collison, Alan B.; Non-Final Office Action for U.S. Appl. No. 17/123,676, filed Dec. 16, 2020, dated Feb. 3, 2021, 23 pgs.

Jan. 28, 2021, Collison, Alan B.; Corrected Notice of Allowance for U.S. Appl. No. 16/658,756, filed Oct. 21, 2019, dated Jan. 28, 2021, 3 pgs.

Nov. 2, 2020, MP Global Products, LLC; Office Action for Chinese patent application No. 201780081689.7, dated Nov. 2, 2020, 17 pgs.

Dec. 3, 2020, MP Global Products LLC: Office Action for European application No. 17868605.1, dated Dec. 3, 2020, 4 pgs.

Nov. 27, 2020, MP Global Products, LLC; Examination Report for Australian patent application No. 2017359035, dated Nov. 27, 2020, 3 pgs.

Waltermire, Jamie; Certificate of Correction for U.S. Appl. No. 15/482,186, filed Apr. 7, 2017, dated Dec. 29, 2020, 1 pg.

Waltermire, Jamie; Corrected Notice of Allowance for U.S. Appl. No. 15/482,186, filed Apr. 7, 2017, dated Jun. 2, 2020, 10 pgs.

Waltermire, Jamie; Corrected Notice of Allowance for U.S. Appl. No. 15/482,186, filed Apr. 7, 2017, dated Sep. 2, 2020, 12 pgs.

Waltermire, Jamie; Non-Final Office Action for U.S. Appl. No. 15/482,186, filed Apr. 7, 2017, dated Aug. 20, 2019, 81 pgs.

Waltermire, Jamie; Notice of Allowance for U.S. Appl. No. 15/482,186, filed Apr. 7, 2017, dated Mar. 5, 2020, 29 pgs.

Waltermire, Jamie; Requirement for Restriction/Election for U.S. Appl. No. 15/482,186, filed Apr. 7, 2017, dated Apr. 17, 2019, 7 pgs.

Waltermire, Jamie; Applicant-Initiated Interview Summary for U.S. Appl. No. 16/526,511, filed Jul. 30, 2019, dated Jun. 12, 2020, 5 pgs.

Waltermire, Jamie; Corrected Notice of Allowance for U.S. Appl. No. 16/526,511, filed Jul. 30, 2019, dated Oct. 30, 2020, 14 pgs.

Waltermire, Jamie; Corrected Notice of Allowance for U.S. Appl. No. 16/526,511, filed Jul. 30, 2019, dated Nov. 30, 2020, 9 pgs.

Waltermire, Jamie; Final Office Action for U.S. Appl. No. 16/526,511, filed Jul. 30, 2019, dated May 19, 2020, 39 pgs.

Waltermire, Jamie; Non-Final Office Action for U.S. Appl. No. 16/526,511, filed Jul. 30, 2019, dated Dec. 9, 2019, 55 pgs.

Waltermire, Jamie; Non-Final Office Action for U.S. Appl. No. 16/526,511, filed Jul. 30, 2019, dated Jul. 10, 2020, 23 pgs.

Waltermire, Jamie; Notice of Allowance for U.S. Appl. No. 16/526,511, filed Jul. 30, 2019, dated Sep. 14, 2020, 18 pgs.

Waltermire, Jamie; Final Office Action for U.S. Appl. No. 15/482,200, filed Apr. 7, 2017, dated Jan. 2, 2019, 23 pgs.

Waltermire, Jamie; Non-Final Office Action for U.S. Appl. No. 15/482,200, filed Apr. 7, 2017, dated Jun. 11, 2018, 36 pgs.

Waltermire, Jamie; Notice of Allowance for U.S. Appl. No. 15/482,200, filed Apr. 7, 2017, dated Jun. 14, 2019, 25 pgs.

Waltermire, Jamie; Supplemental Notice of Allowance for U.S. Appl. No. 15/482,200, filed Apr. 7, 2017, dated Jul. 26, 2019, 9 pgs.

Waltermire, Jamie; Supplemental Notice of Allowance for U.S. Appl. No. 15/482,200, filed Apr. 7, 2017, dated Aug. 12, 2019, 7 pgs.

Waltermire, Jamie; Supplemental Notice of Allowance for U.S. Appl. No. 15/482,200, filed Apr. 7, 2017, dated Sep. 10, 2019, 8 pgs.

Waltermire, Jamie; Applicant-Initiated Interview Summary for U.S. Appl. No. 16/530,045, filed Aug. 2, 2019, dated Jun. 15, 2020, 3 pgs.

Waltermire, Jamie; Final Office Action for U.S. Appl. No. 16/530,045, filed Aug. 2, 2019, dated Nov. 24, 2020, 40 pgs.

Waltermire, Jamie; Non-Final Office Action for U.S. Appl. No. 16/530,045, filed Aug. 2, 2019, dated Dec. 20, 2019, 61 pgs.

Waltermire, Jamie; Non-Final Office Action for U.S. Appl. No. 16/530,045, filed Aug. 2, 2019, dated May 27, 2020, 38 pgs.

Waltermire, Jamie; Non-Final Office Action for U.S. Appl. No. 16/164,933, filed Oct. 19, 2018, dated Nov. 18, 2020, 104 pgs.

Waltermire, Jamie; Corrected Notice of Allowance for U.S. Appl. No. 15/590,345, filed May 9, 2017, dated Feb. 18, 2020, 9 pgs.

Waltermire, Jamie; Final Office Action for U.S. Appl. No. 15/590,345, filed May 9, 2017, dated Mar. 19, 2019, 42 pgs.

Waltermire, Jamie; Non-Final Office Action for U.S. Appl. No. 15/590,345, filed May 9, 2017, dated Aug. 24, 2018, 41 pgs.

Waltermire, Jamie; Notice of Allowance for U.S. Appl. No. 15/590,345, filed May 9, 2017, dated Oct. 1, 2019, 28 pgs.

Waltermire, Jamie; Supplemental Notice of Allowance for U.S. Appl. No. 15/590,345, filed May 9, 2017, dated Jan. 9, 2020, 8 pgs.

Waltermire, Jamie; Supplemental Notice of Allowance for U.S. Appl. No. 15/590,345, filed May 9, 2017, dated Dec. 3, 2019, 14 pgs.

Waltermire, Jamie; Applicant-Initiated Interview Summary for U.S. Appl. No. 15/590,349, filed May 9, 2017, dated Dec. 3, 2019, 3 pgs.

Waltermire, Jamie; Corrected Notice of Allowance for U.S. Appl. No. 15/590,349, filed May 9, 2017, dated Nov. 2, 2020, 9 pgs.

Waltermire, Jamie; Corrected Notice of Allowance for U.S. Appl. No. 15/590,349, filed May 9, 2017, dated Dec. 22, 2020, 9 pgs.

Waltermire, Jamie; Corrected Notice of Allowance for U.S. Appl. No. 15/590,349, filed May 9, 2017, dated Feb. 5, 2021, 9 pgs.

Waltermire, Jamie; Final Office Action for U.S. Appl. No. 15/590,349, filed May 9, 2017, dated Jan. 6, 2020, 26 pgs.

Waltermire, Jamie; Final Office Action for U.S. Appl. No. 15/590,349, filed May 9, 2017, dated May 9, 2019, 31 pgs.

Waltermire, Jamie; Non-Final Office Action for U.S. Appl. No. 15/590,349, filed May 9, 2017, dated Nov. 5, 2018, 41 pgs.

Waltermire, Jamie; Non-Final Office Action for U.S. Appl. No. 15/590,349, filed May 9, 2017, dated Jun. 12, 2020, 30 pgs.

Waltermire, Jamie; Non-Final Office Action for U.S. Appl. No. 15/590,349, filed May 9, 2017, dated Sep. 5, 2019, 25 pgs.

Waltermire, Jamie; Notice of Allowance for U.S. Appl. No. 15/590,349, filed May 9, 2017, dated Oct. 20, 2020, 20 pgs.

Waltermire, Jamie; Requirement for Restriction/Election for U.S. Appl. No. 15/590,349, filed Jun. 9, 2017, dated Aug. 30, 2018, 10 pgs.

Waltermire, Jamie; Final Office Action for U.S. Appl. No. 16/293,716, filed Mar. 6, 2019, dated Oct. 29, 2020, 19 pgs.

Waltermire, Jamie; Final Office Action for U.S. Appl. No. 16/293,716, filed Mar. 6, 2019, dated Sep. 10, 2020, 24 pgs.

(56) References Cited

OTHER PUBLICATIONS

Waltermire, Jamie; Non-Final Office Action for U.S. Appl. No. 16/293,716, filed Mar. 6, 2019, dated Feb. 5, 2021, 18 pgs.
Waltermire, Jamie; Non-Final Office Action for U.S. Appl. No. 16/293,716, filed Mar. 6, 2019, dated May 5, 2020, 70 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Non-Final Office Action for U.S. Appl. No. 16/526,555, filed Jul. 30, 2019, dated Oct. 27, 2020, 39 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Requirement for Restriction/Election for U.S. Appl. No. 16/526,555, filed Jul. 30, 2019, dated Jan. 17, 2020, 7 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Supplemental Notice of Allowance for U.S. Appl. No. 16/164,933, filed Oct. 19, 2018, dated May 26, 2021, 10 pgs.
Waltermire, Jamie; Supplemental Notice of Allowance for U.S. Appl. No. 16/164,933, filed Oct. 19, 2018, dated Jun. 16, 2021, 7 pgs.
Waltermire, Jamie; Certificate of Correction for U.S. Appl. No. 15/590,349, filed Jun. 9, 2017, dated Jun. 1, 2021, 1 pg.
Waltermire, Jamie; Non-Final Office Action for U.S. Appl. No. 16/293,716, filed Mar. 6, 2019, dated Jul. 26, 2021, 26 pgs.
Waltermire, Jamie; Notice of Allowance for U.S. Appl. No. 16/526,555, filed Jul. 30, 2019, dated May 21, 2021, 32 pgs.
Waltermire, Jamie; Supplemental Notice of Allowance for U.S. Appl. No. 16/526,555, filed Jul. 30, 2019, dated Jun. 8, 2021, 13 pgs.
Waltermire, Jamie; Supplemental Notice of Allowance for U.S. Appl. No. 16/526,555, filed Jul. 30, 2019, dated Jul. 6, 2021, 7 pgs.
Waltermire, Jamie; Notice of Allowance for U.S. Appl. No. 16/381,678, filed Apr. 11, 2019, dated Jun. 3, 2021, 14 pgs.
Waltermire, Jamie; Final Office Action for U.S. Appl. No. 16/689,433, filed Nov. 20, 2019, dated Aug. 5, 2021, 23 pgs.
Sollie, Greg; Certificate of Correction for U.S. Appl. No. 15/845,540, filed Dec. 18, 2017, dated Jun. 1, 2021, 1 pg.
Collison, Alan B.; Applicant-Initiated Interview Summary for U.S. Appl. No. 17/123,673, filed Dec. 16, 2020, dated Jun. 24, 2021, 2 pgs.
Collison, Alan B.; Notice of Allowance for U.S. Appl. No. 17/123,673, filed Dec. 16, 2020, dated Jul. 1, 2021, 12 pgs.
Collison, Alan B.; Supplemental Notice of Allowance for U.S. Appl. No. 17/123,676, filed Dec. 16, 2020, dated Jun. 1, 2021, 10 pgs.
Waltermire, Jamie; Notice of Allowance for U.S. Appl. No. 16/689,407, filed Nov. 20, 2019, dated Jul. 19, 2021, 12 pgs.
Collison, Alan B.; Supplemental Notice of Allowance for U.S. Appl. No. 17/123,676, filed Dec. 16, 2020, dated Jun. 24, 2021, 7 pgs.
Sollie, Greg; Corrected Notice of Allowance for U.S. Appl. No. 15/988,550, filed May 24, 2018, dated Jun. 11, 2021, 7 pgs.
Sollie, Greg; Advisory Action for U.S. Appl. No. 16/530,052, filed Aug. 2, 2019, dated Jun. 29, 2021, 15 pgs.
Sollie, Greg; Non-Final Office Action for U.S. Appl. No. 16/879,811, filed May 21, 2020, dated Jun. 22, 2021, 93 pgs.
Sollie, Greg; Notice of Allowance for U.S. Appl. No. 16/879,811, filed May 21, 2020, dated Jul. 7, 2021, 5 pgs.
Sollie, Greg; Corrected Notice of Allowance for U.S. Appl. No. 16/408,981, filed May 10, 2019, dated Jun. 16, 2021, 9 pgs.
Sollie, Greg; Notice of Allowance for U.S. Appl. No. 16/886,040, filed May 28, 2020, dated Jul. 7, 2021, 12 pgs.
Waltermire, Jamie; International Preliminary Report on Patentability for PCT Application No. PCT/US18/65464, filed Dec. 13, 2018, dated Jun. 24, 2021, 8 pgs.
Sollie, Greg; International Preliminary Report on Patentability for PCT Application No. PCT/US19/60486, filed Nov. 18, 2019, dated May 27, 2021, 9 pgs.
Sollie, Greg; International Preliminary Report on Patentability for PCT Application No. PCT/US19/59764, filed Nov. 5, 2019, dated May 27, 2021, 9 pgs.
Waltermire, Jamie; Non-Final Office Action for U.S. Appl. No. 16/721,995, filed Dec. 20, 2019, dated Dec. 27, 2021, 133 pgs.
Collison, Alan B.; Certificate of Correction for U.S. Appl. No. 17/123,676, filed Dec. 16, 2020, dated Jan. 4, 2021, 1 pg.
Sollie, Greg; Final Office Action for U.S. Appl. No. 17/185,616, filed Feb. 25, 2021, dated Jan. 28, 2022, 37 gs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Salazar Packaging; Article entitle: "Custom Packaging and Design", located at <https://salazarpackaging.com/custom-packaging-and-design/>, accessed on Sep. 28, 2017, 2 pgs.
Collison, Alan B.; Supplemental Notice of Allowance for U.S. Appl. No. 15/677,738, filed Aug. 15, 2017, dated Dec. 10, 2019, 4 pgs.
Collison, Alan B.; Notice of Allowance for U.S. Appl. No. 15/677,738, filed Aug. 15, 2017, dated Oct. 29, 2019, 14 pgs.
CooLiner ® Insulated Shipping Bags, available at <http://www/chem-tran.com/packaging/supplies/cooliner-insulated- shipping-bags.php>, accessed on Oct. 18, 2019, 4 pgs.
"Green Cell Foam Shipping Coolers", located at <https://www.greencellfoam.com/shipping-coolers>, accessed on Oct. 18, 2019, 4 pgs.
Collison, Alan B.; Corrected Notice of Allowance for U.S. Appl. No. 15/677,738, filed Aug. 15, 2017, dated Jul. 15, 2019, 7 pgs.
Collison, Alan B.; Notice of Allowance for U.S. Appl. No. 15/677,738, filed Aug. 15, 2017, dated Jun. 19, 2019, 10 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf.
Collison, Alan B.; Applicant Interview Summary for U.S. Appl. No. 15/677,738, filed Aug. 15, 2017, dated Apr. 22, 2019, 4 pgs.
Collison, Alan B.; Final Office Action for U.S. Appl. No. 15/677,738, filed Aug. 15, 2017, dated Feb. 28, 2019, 14 pgs.
Collison, Alan B.; Applicant Interview Summary for U.S. Appl. No. 15/677,738, filed Aug. 15, 2017, dated Dec. 5, 2018, 4 pgs.
Collison, Alan B.; Non-Final Office Action for U.S. Appl. No. 15/677,738, filed Aug. 15, 2017, dated Oct. 23, 2018, 11 pgs.
Collison, Alan B.; Requirement for Restriction/Election for U.S. Appl. No. 15/677,738, filed Aug. 15, 2017, dated Jul. 31, 2018, 8 pgs.
Collison, Alan B.; Requirement for Restriction/Election for U.S. Appl. No. 15/677,738, filed Aug. 15, 2017, dated Jul. 3, 2018, 8 pgs.
MP Global Products, LLC; International Search Report and Written Opinion of the International Searching Authority for PCT/US2017/060403, filed Nov. 7, 2017, dated Feb. 19, 2018, 15 pgs.
Collison, Alan B.; Corrected Notice of Allowance for U.S. Appl. No. 16/658,756, filed Oct. 21, 2019, dated Jan. 28, 2021, 3 pgs.
MP Global Products, LLC; Office Action for Chinese patent application No. 201780081689.7, dated Nov. 2, 2020, 17 pgs.
MP Global Products LLC: Office Action for European application No. 17868605.1, dated Dec. 3, 2020, 4 pgs.
MP Global Products, LLC; Examination Report for Australian patent application No. 2017359035, dated Nov. 27, 2020, 3 pgs.
Collison, Alan B.; Notice of Allowance for U.S. Appl. No. 16/658,756, filed Oct. 21, 2019, dated Oct. 23, 2020, 10 pgs.
Collison, Alan B.; Advisory Action for U.S. Appl. No. 16/658,756, filed Oct. 21, 2019, dated Sep. 25, 2020, 4 pgs.
Collison, Alan B.; Applicant Interview Summary for U.S. Appl. No. 16/658,756, filed Oct. 21, 2019, dated Jun. 29, 2020, 3 pgs.
Collison, Alan B.; Final Office Action for U.S. Appl. No. 16/658,756, filed Oct. 21, 2019, dated Jun. 17, 2020, 10 pgs.
Collison, Alan B.; Applicant Interview Summary for U.S. Appl. No. 16/658,756, filed Oct. 21, 2019, dated May 6, 2020, 3 pgs.
MP Global Products LLC: European Search Report for serial No. 17868605.1, dated Mar. 16, 2020, 7 pgs.

(56) References Cited

OTHER PUBLICATIONS

Collison, Alan B.; Non-Final Office Action for U.S. Appl. No. 16/658,756, filed Oct. 21, 2019, dated Feb. 4, 2020, 14 pgs.
Collison, Alan B.; Corrected Notice of Allowance for U.S. Appl. No. 16/414,309, filed May 16, 2019, dated Nov. 27, 2020, 9 pgs.
Collison, Alan B.; Corrected Notice of Allowance for U.S. Appl. No. 16/414,309, filed May 16, 2019, dated Nov. 16, 2020, 10 pgs.
Collison, Alan B.; Notice of Allowance for U.S. Appl. No. 16/414/309, filed May 16, 2019, dated Oct. 21, 2020, 6 pgs.
Collison, Alan B.; Applicant-Initiated Interview Summary for U.S. Appl. No. 16/414/309, filed May 16, 2019, dated Oct. 15, 2020, 3 pgs.
Collison, Alan B.; Final Office Action for U.S. Appl. No. 16/414,309, filed May 16, 2019, dated Oct. 8, 2020, 15 pgs.
Collison, Alan B.; Applicant-Initiated Interview Summary for U.S. Appl. No. 16/414,309, filed May 16, 2019, dated Aug. 21, 2020, 3 pgs.
Collison, Alan B.; Non-Final Office Action for U.S. Appl. No. 16/414,309, filed May 16, 2019, dated Jul. 17, 2020, 77 pgs.
Collison, Alan B.; Requirement for Restriction/Election for U.S. Appl. No. 16/414,309, filed May 16, 2019, dated Jun. 16, 2020, 5 pgs.
Collison, Alan B.; Supplemental Notice of Allowance for U.S. Appl. No. 16/414,310, filed May 16, 2019, dated Dec. 3, 2020, 8 pgs.
Collison, Alan B.; Notice of Allowance for U.S. Appl. No. 16/414,310, filed May 16, 2019, dated Nov. 13, 2020, 15 pgs.
Collison, Alan; Final Office Action for U.S. Appl. No. 16/414,310, filed May 16, 2019, dated Oct. 13, 2020, 30 pgs.
Collison, Alan B.; Applicant-Initiated Interview Summary for U.S. Appl. No. 16/414,310, filed May 16, 2019, dated Jul. 30, 2020, 3 pgs.
Collison, Alan B.; Non-Final Office Action for U.S. Appl. No. 16/414,310, filed May 16, 2019, dated Jul. 8, 2020, 84 pgs.
Collison, Alan B.; Non-Final Office Action for U.S. Appl. No. 17/123,676, filed Dec. 16, 2020, dated Feb. 3, 2021, 23 pgs.
Sollie, Greg; Applicant-Initiated Interview Summary for U.S. Appl. No. 15/988/550, filed May 24, 2018, dated Dec. 24, 2020, 2 pgs.
Sollie, Greg; Final Office Action for U.S. Appl. No. 15/988,550, filed May 24, 2018, dated Aug. 27, 2020, 27 pgs.
Sollie, Greg; Non-Final Office Action for U.S. Appl. No. 15/988,550, filed May 24, 2018, dated Mar. 11, 2020, 35 pgs.
Sollie, Greg; Applicant Initiated Interview Summary for U.S. Appl. No. 15/988,550, filed May 24, 2018, dated Dec. 27, 2019, 3 pgs.
Sollie, Greg; Non-Final Office Action for U.S. Appl. No. 15/988,550, filed May 24, 2018, dated Oct. 9, 2019, 17 pgs.
Sollie, Greg; Final Office Action for U.S. Appl. No. 15/988,550, filed May 24, 2018, dated Aug. 14, 2019, 19 pgs.
Sollie, Greg; Non-Final Office Action for U.S. Appl. No. 15/988,550, filed May 24, 2018, dated May 29, 2019, 48 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
MP Global Products LLC: European Office Action Response for application No. 17868605.1, filed Jan. 19, 2021, 15 pgs.
MP Global Products LLC: European Office Action for application No. 17868605.1, dated Dec. 3, 2020, 4 pgs.
MP Global Products LLC: European Search Report Response for serial No. 17868605.1, filed Oct. 2, 2020, 15 pgs.
Sollie, Greg; International Preliminary Report on Patentability for PCT/US18/65463, filed Dec. 13, 2018, dated Dec. 3, 2020, 9 pgs.
Sollie, Greg; International Search Report and Written Opinion for PCT/US18/65463, filed Dec. 13, 2018, dated Mar. 25, 2019, 11 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/60486, filed Nov. 18, 2019, dated Jan. 13, 2020, 10 pgs.
Sollie, Greg; International Search Report and Written Opinion for PCT Application No. PCT/US19/59764, filed Nov. 5, 2019, dated Jul. 1, 2020, 13 pgs.
Sollie, Greg; Invitation to Pay Additional Fees for PCT/US19/59764, filed Nov. 5, 2019, mailed Jan. 2, 2020, 2 pgs.
Sollie, Greg; Final Office Action for U.S. Appl. No. 16/280,595, filed Feb. 20, 2019, dated Dec. 30, 2020, 25 pgs.
Sollie, Greg; Non-Final Office Action for U.S. Appl. No. 16/280,595, filed Feb. 20, 2019, dated Aug. 28, 2020, 26 pgs.
Sollie, Greg; Advisory Action for U.S. Appl. No. 16/280,595, filed Feb. 20, 2019, dated Jul. 6, 2020, 3 pgs.
Sollie, Greg; Applicant-Initiated Interview Summary for U.S. Appl. No. 16/280,595, filed Feb. 20, 2019 dated May 6, 2020, 3 pgs.
Sollie, Greg; Final Office Action for U.S. Appl. No. 16/280,595, filed Feb. 20, 2019, dated Mar. 24, 2020, 20 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/280,595, filed Feb. 20, 2019, dated May 29, 2019, 60 pgs.
Sollie, Greg; Non-Final Office Action for U.S. Appl. No. 16/530,052, filed Aug. 2, 2019, dated Dec. 18, 2020, 17 pgs.
Sollie, Greg; Final Office Action for U.S. Appl. No. 16/530,052, filed Aug. 2, 2019, dated Aug. 28, 2020, 29 pgs.
Sollie, Greg; Non-Final Office Action for U.S. Appl. No. 16/530,052, filed Aug. 2, 2019, dated Mar. 3, 2020, 24 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Final Office Action for U.S. Appl. No. 16/530,052, filed Aug. 2, 2019, dated Dec. 27, 2019, 49 pgs.
Sollie, Greg; Non-Final Office Action for U.S. Appl. No. 16/530,052, filed Aug. 2, 2019, dated Oct. 2, 2019, 12 pgs.
Sollie, Greg; Corrected Notice of Allowance for U.S. Appl. No. 16/401,603, filed May 2, 2019, dated Nov. 24, 2020, 8 pgs.
Sollie, Greg; Corrected Notice of Allowance for U.S. Appl. No. 16/401,603, filed May 2, 2019, dated Nov. 3, 2020, 9 pgs.
Sollie, Greg; Notice of Allowance for U.S. Appl. No. 16/401,603, filed May 2, 2019, dated Aug. 31, 2020, 14 pgs.
Sollie, Greg; Final Office Action for U.S. Appl. No. 16/401,603, filed May 2, 2019, dated Jun. 30, 2020, 13 pgs.
Sollie, Greg; Applicant-Initiated Interview Summary for U.S. Appl. No. 16/401,603, filed May 2, 2019, dated May 15, 2020, 3 pgs.
Sollie, Greg; Non-Final Office Action for U.S. Appl. No. 16/401,603, filed May 2, 2019, dated Mar. 10, 2020, 67 pgs.
Sollie, Greg; Requirement for Restriction/Election for U.S. Appl. No. 16/401,603, filed May 2, 2019, dated Feb. 18, 2020, 6 pgs.
Cellulose Material Solutions, LLC; Brochure for Infinity Care Thermal Liner, accessed on Oct. 22, 2018, 2 pgs.
Sollie, Greg; Corrected Notice of Allowance for U.S. Appl. No. 16/401,607, filed May 2, 2019, dated Jan. 4, 2021, 9 pgs.
Sollie, Greg; Notice of Allowance for U.S. Appl. No. 16/401,607, filed May 2, 2019, dated Dec. 4, 2020, 12 pgs.
Sollie, Greg; Non-Final Office Action for U.S. Appl. No. 16/401,607, filed May 2, 2019, dated Aug. 19, 2020, 88 pgs.
Uline; Article entitled: Corrugated Corner Protectors—4×4", accessed on Oct. 25, 2018, 1 pg.
Sollie, Greg; Notice of Allowance for U.S. Appl. No. 16/382,710, filed Apr. 12, 2019, dated Oct. 21, 2020, 5 pgs.
Sollie, Greg; Corrected Notice of Allowance for U.S. Appl. No. 16/382,710, filed Apr. 12, 2019, dated Sep. 24, 2020, 9 pgs.
Sollie, Greg; Notice of Allowance for U.S. Appl. No. 16/382,710, filed Apr. 12, 2019, dated Jun. 3, 2020, 12 pgs.
Sollie, Greg; Final Office Action for U.S. Appl. No. 16/382,710, filed Apr. 12, 2019, dated Apr. 6, 2020, 33 pgs.
Sollie, Greg; Non-Final Office Action for U.S. Appl. No. 16/382,710, filed Apr. 12, 2019, dated Oct. 10, 2019, 49 pgs.
Sollie, Greg; Requirement for Restriction/Election for U.S. Appl. No. 16/382,710, filed Apr. 12, 2019, dated Jul. 15, 2019, 6 pgs.

(56) References Cited

OTHER PUBLICATIONS

DHL Express; Brochure for Dry Ice Shipping Guidelines, accessed on Oct. 26, 2018, 12 pgs.
Sollie, Greg; Corrected Notice of Allowance for U.S. Appl. No. 16/567,192, filed Sep. 11, 2019, dated Oct. 20, 2020, 8 pgs.
Sollie, Greg; Notice of Allowance for U.S. Appl. No. 16/567,192, filed Sep. 11, 2019, dated Aug. 7, 2020, 14 pgs.
Sollie, Greg; Final Office Action for U.S. Appl. No. 16/567,192, filed Sep. 11, 2019, dated Jun. 8, 2020, 20 pgs.
Sollie, Greg; Non-Final Office Action for U.S. Appl. No. 16/567,192, filed Sep. 11, 2019, dated Dec. 10, 2019, 49 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Sollie, Greg; Final Office Action for U.S. Appl. No. 16/408,981, filed May 10, 2019, dated Dec. 29, 2020, 22 pgs.
Sollie, Greg; Non-Final Office Action for U.S. Appl. No. 16/408,981, filed May 10, 2019, dated Sep. 16, 2020, 40 pgs.
Sollie, Greg; Final Office Action for U.S. Appl. No. 16/408,981, filed May 10, 2019, dated Feb. 24, 2020, 29 pgs.
Sollie, Greg; Non-Final Office Action for U.S. Appl. No. 16/408,981, filed May 10, 2019, dated Aug. 20, 2019, 50 pgs.
Sollie, Greg; Requirement for Restriction/Election for U.S. Appl. No. 16/886,040, filed May 28, 2020, dated Dec. 23, 2020, 6 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Preliminary Report on Patentability for PCT Application No. PCT/US18/65459, filed Dec. 13, 2018, dated Jul. 2, 2020, 11 pgs.
Sollie, Greg; International Search Report and Written Opinion for PCT Application No. PCT/US18/65459, filed Dec. 13, 2018, dated May 1, 2019, 15 pgs.
Sollie, Greg; International Preliminary Report on Patentability for PCT Application No. PCT/US18/65461, filed Dec. 13, 2018, dated Jul. 2, 2020, 12 pgs.
Sollie, Greg; International Search Report and Written Opinion for PCT Application No. PCT/US18/65461, filed Dec. 13, 2018, dated Mar. 21, 2019, 13 pgs.
MP Global Products, LLC; First Examination Report for Australian patent application No. 2017359035, filed Nov. 7, 2017, dated Nov. 27, 2020, 3 pgs.
Waltermire, Jamie; Non-Final Office Action for U.S. Appl. No. 17/079,437, filed Oct. 24, 2020, dated Sep. 20, 2021, 108 pgs.
Waltermire, Jamie; Notice of Allowance for U.S. Appl. No. 16/164,933, filed Oct. 19, 2018, dated Aug. 9, 2021, 10 pgs.
Waltermire, Jamie; Requirement for Restriction/Election for U.S. Appl. No. 16/721,995, filed Dec. 20, 2019, dated Aug. 13, 2021, 6 pgs.
Waltermire, Jamie; Supplemental Notice of Allowance for U.S. Appl. No. 16/526,555, filed Jul. 30, 2019, dated Aug. 11, 2021, 8 pgs.
Waltermire, Jamie; Corrected Notice of Allowance for U.S. Appl. No. 16/381,678, filed Apr. 11, 2019, dated Aug. 9, 2021, 8 pgs.
Waltermire, Jamie; Examiner-Initiated Interview Summary for U.S. Appl. No. 16/381,678, filed Apr. 11, 2019, dated Aug. 30, 2021, 2 pgs.
Waltermire, Jamie; Corrected Notice of Allowance for U.S. Appl. No. 16/689,407, filed Nov. 20, 2019, dated Aug. 20, 2021, 9 pgs.
Colison, Alan B.; Corrected Notice of Allowance for U.S. Appl. No. 17/123,673, filed Dec. 16, 2020, dated Oct. 6, 2021, 8 pgs.
Collison, Alan B.; Corrected Notice of Allowance for U.S. Appl. No. 17/123,673, filed Dec. 16, 2020, dated Aug. 23, 2021, 9 pgs.
Collison, Alan B.; Supplemental Notice of Allowance for U.S. Appl. No. 17/123,676, filed Dec. 16, 2020, dated Sep. 13, 2021, 10 pgs.
Sollie, Greg; Final Office Action for U.S. Appl. No. 16/280,595, filed Feb. 20, 2019, dated Aug. 16, 2021, 21 pgs.
Sollie, Greg; Non-Final Office Action for U.S. Appl. No. 16/530,052, filed Aug. 2, 2019, dated Aug. 13, 2021, 22 pgs.
Sollie, Greg; Non-Final Office Action for U.S. Appl. No. 17/078,884, filed Oct. 23, 2020, dated Aug. 12, 2021, 105 pgs.
Sollie, Greg; Non-Final Office Action for U.S. Appl. No. 17/078,891, filed Oct. 23, 2020, dated Aug. 23, 2021, 104 pgs.
Sollie, Greg; Non-Final Office Action for U.S. Appl. No. 17/187,239, filed Feb. 26, 2021, dated Sep. 21, 2021, 99 pgs.
Sollie, Greg; Notice of Allowance for U.S. Appl. No. 17/187,239, filed Feb. 26, 2021, dated Oct. 13, 2021, 5 pgs.
Sollie, Greg; Corrected Notice of Allowance for U.S. Appl. No. 16/879,811, filed May 21, 2020, dated Oct. 6, 2021, 8 pgs.
Sollie, Greg; Non-Final Office Action for U.S. Appl. No. 17/185,616, filed Feb. 25, 2021, dated Sep. 15, 2021, 103 pgs.
Sollie, Greg; Corrected Notice of Allowance for U.S. Appl. No. 16/886,040, filed May 28, 2020, dated Oct. 7, 2021, 8 pgs.
Sollie, Greg; Corrected Notice of Allowance for U.S. Appl. No. 16/886,040, filed May 28, 2020, dated Aug. 20, 2021, 9 pgs.
Carlson, Dave; Article entitled: "FBA Updates Voluntary Standard for Recyclable Wax Alternatives", dated Aug. 14, 2013, Fiber Box Association (Year: 2013), 2 pgs.
Sollie, Greg; Non-Final Office Action for U.S. Appl. No. 17/100,819, filed Nov. 21, 2020, dated Sep. 29, 2021, 107 pgs.
Waltermire, Jamie; Final Office Action for U.S. Appl. No. 17/079,437, filed Oct. 24, 2020, dated Feb. 24, 2022, 24 pgs.
Waltermire, Jamie; Non-Final Office Action for U.S. Appl. No. 16/530,045, filed Aug. 2, 2019, dated Feb. 10, 2022, 82 pgs.
Collison, Alan B.; Certificate of Correction for U.S. Appl. No. 11,214,427, filed Dec. 16, 2020, dated Mar. 29, 2022, 1 pg.
Collison, Alan B.; Notice of Allowance for U.S. Appl. No. 17/502,599, filed Oct. 15, 2021, dated Mar. 9, 2022, 94 pgs.
Sollie, Greg; Advisory Action for U.S. Appl. No. 16/530,052, filed Aug. 2, 2019, dated Mar. 9, 2022, 4 pgs.
Sollie, Greg; Certificate of Correction for U.S. Appl. No. 16/879,811, filed May 21, 2020, dated Feb. 8, 2022, 1 pg.
Waltermire, Jamie; Notice of Allowance for U.S. Appl. No. 16/293,716, filed Mar. 6, 2019, dated Nov. 3, 2021, 20 pgs.
Waltermire, Jamie; Certificate of Correction for U.S. Appl. No. 16/526,555, filed Jul. 30, 2019, dated Nov. 16, 2021, 1 pg.
Waltermire, Jamie; Corrected Notice of Allowance for U.S. Appl. No. 16/689,407, filed Nov. 20, 2019, dated Oct. 20, 2021, 8 pgs.
Waltermire, Jamie; Corrected Notice of Allowance for U.S. Appl. No. 16/689,433, filed Nov. 20, 2019, dated Nov. 12, 2021, 9 pgs.
Waltermire, Jamie; Notice of Allowance for U.S. Appl. No. 16/689,433, filed Nov. 20, 2019, dated Oct. 15, 2021, 14 pgs.
Collison, Alan B.; Non-Final Office Action for U.S. Appl. No. 17/181,377, filed Feb. 22, 2021, dated Jul. 1, 2021, 22 pgs.
Collison, Alan B.; Notice of Allowance for U.S. Appl. No. 17/181,377, filed Feb. 22, 2021, dated Oct. 21, 2021, 6 pgs.
Collison, Alan B.; Restriction Requirement for U.S. Appl. No. 17/181,377, filed Feb. 22, 2021, dated Apr. 22, 2021, 6 pgs.
Collison, Alan B.; Non-Final Office Action for U.S. Appl. No. 17/502,599, filed Oct. 15, 2021, dated Nov. 30, 2021, 6 pgs.
Sollie, Greg; Non-Final Office Action for U.S. Appl. No. 16/280,595, filed Feb. 20, 2019, dated Dec. 8, 2021, 17 pgs.
Sollie, Greg; Final Office Action for U.S. Appl. No. 16/530,052, filed Aug. 2, 2019, dated Dec. 8, 2021, 17 pgs.
Sollie, Greg; Notice of Allowance for U.S. Appl. No. 17/078,884, filed Oct. 23, 2020, dated Nov. 22, 2021, 12 pgs.
Sollie, Greg; Applicant-Initiated Interview Summary for U.S. Appl. No. 17/078,891, filed Oct. 23, 2020, dated Oct. 25, 2021, 2 pgs.
Sollie, Greg; Notice of Allowance for U.S. Appl. No. 17/078,891, filed Oct. 23, 2020, dated Dec. 1, 2021, 12 pgs.
Sollie, Greg; Notice of Allowance for U.S. Appl. No. 16/886,040, filed May 28, 2020, dated Nov. 18, 2021, 10 pgs.
Sollie, Greg; International Preliminary Report on Patentability for PCT Application No. PCT/US20/24820, filed Mar. 26, 2020, dated Nov. 11, 2021, 13 pgs.
MP Global Products LLC; Office Action for Chinese Patent Application No. 201780081689.7, dated May 14, 2021, 17 pgs.
MP Global Products, LLC; Office Action for Canadian patent application No. 3,043,192, filed Nov. 7, 2017, dated Oct. 25, 2021, 11 pgs.

(56) References Cited

OTHER PUBLICATIONS

MP Global Products, LLC; Decision on Rejection for Chinese patent application No. 201780081689.7, dated Sep. 23, 2021, 15 pgs.
Waltermire, Jamie; Notice of Allowance for U.S. Appl. No. 16/164,933, filed Oct. 19, 2018, dated Jun. 14, 2021, 24 pgs.
Waltermire, Jamie; Final Office Action for U.S. Appl. No. 16/526,555, filed Jul. 30, 2019, dated Mar. 8, 2021, 25 pgs.
Waltermire, Jamie; Non-Final Office Action for U.S. Appl. No. 16/381,678, filed Apr. 11, 2019, dated Mar. 5, 2021, 36 pgs.
Waltermire, Jamie; Final Office Action for U.S. Appl. No. 16/689,407, filed Nov. 20, 2019, dated Apr. 23, 2021, 18 pgs.
Waltermire, Jamie; Non-Final Office Action for U.S. Appl. No. 16/689,433, filed Nov. 20, 2019, dated Feb. 23, 2021, 88 pgs.
Collison, Alan B.; Certificate of Correction for U.S. Appl. No. 16/414/309, filed May 16, 2019, dated Mar. 9, 2021, 1 pg.
Collison, Alan B.; Non-Final Office Action for U.S. Appl. No. 17/123,673, filed Dec. 16, 2020, dated Mar. 23, 2021, 86 pgs.
Collison, Alan B.; Applicant-Initiated Interview Summary for U.S. Appl. No. 17/123,676, filed Dec. 16, 2020, dated May 4, 2021, 4 pgs.
Collison, Alan B.; Notice of Allowance for U.S. Appl. No. 17/123,676, filed Dec. 16, 2020, dated May 13, 2021, 93 pgs.
Sollie, Greg; Corrected Notice of Allowance for U.S. Appl. No. 15/988,550, filed May 24, 2018, dated May 10, 2021, 9 pgs.
Sollie, Greg; Notice of Allowance for U.S. Appl. No. 15/988,550, filed May 24, 2018, dated Apr. 13, 2021, 21 pgs.
Sollie, Greg; Non-Final Office Action for U.S. Appl. No. 16/280,595, filed Feb. 20, 2019, dated Apr. 9, 2021, 20 pgs.
Sollie, Greg; Final Office Action for U.S. Appl. No. 16/530,052, filed Aug. 2, 2019, dated Apr. 20, 2021, 27 pgs.
Sollie, Greg; Corrected Notice of Allowance for U.S. Appl. No. 16/401,607, filed May 2, 2019, dated Mar. 15, 2021, 13 pgs.
Sollie, Greg; Corrected Notice of Allowance for U.S. Appl. No. 16/401,607, filed May 2, 2019, dated Apr. 29, 2021, 8 pgs.
Sollie, Greg; Requirement for Restriction/Election for U.S. Appl. No. 16/879,811, filed May 21, 2020, dated Apr. 15, 2021, 6 pgs.
Sollie, Greg; Corrected Notice of Allowance for U.S. Appl. No. 16/408,981, filed May 10, 2019, dated Mar. 15, 2021, 9 pgs.
Sollie, Greg; Corrected Notice of Allowance for U.S. Appl. No. 16/408,981, filed May 10, 2019, dated Apr. 29, 2021, 6 pgs.
Sollie, Greg; Notice of Allowance for U.S. Appl. No. 16/408,981, filed May 10, 2019, dated Feb. 23, 2021, 6 pgs.
Sollie, Greg; Non-Final Office Action for U.S. Appl. No. 16/886,040, filed May 28, 2020, dated Mar. 30, 2021, 39 pgs.
MP Global Products LLC: European Office Action for application No. 17868605.1, dated Apr. 13, 2021, 3 pgs.
Collison, Alan. B.; Extended European Search Report for application No. 21160713.0, filed Nov. 7, 2017, dated May 10, 2021, 7 pgs.
Waltermire, Jamie; Corrected Notice of Allowance for U.S. Appl. No. 15/663,905, filed Jul. 31, 2017, dated Dec. 26, 2019, 7 pgs.
Singh, et al.; Article entitled: "Performance Comparison of Thermal Insulated Packaging Boxes, Bags and Refrigerants for Single-parcel Shipments", published Mar. 13, 2007, 19 pgs.
PERIWRAP; Article entitled: "Insulated Solutions", located at <https://www.peri-wrap.com/insulation/>, accessed on Dec. 3, 2018, 9 pgs.
Un Packaging; Article entitled: "CooLiner @ Insulated Shipping Bags", available at <http://www.chem-tran.com/packaging/supplies/cooliner-insulated-shipping-bags.php>, accessed on Aug. 30, 2017, 2 pgs.
GREENBLUE; "Environmental Technical Briefs of Common Packaging Materials-Fiber-Based Materials", Sustainable Packaging Solution, 2009.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Images of Novolex bag, including an outer paper bag, a corrugated cardboard insert, and an inner foil-covered bubble-wrap bag, publicly available prior to May 9, 2017, 7 pgs.
Duro Bag; Article entitled: "The Load and Fold Bag", accessed on May 24, 2017, copyrighted Apr. 2017, 3 pgs.
TERA-PAK; Article entitled: "Insulated Shipping Containers", located at <http://www.tera-pak.com/>, accessed on Mar. 20, 2017, 3 pgs.
Sollie, Greg; Certificate of Correction for U.S. Appl. No. 16/567,192, filed Sep. 11, 2019, dated Feb. 16, 2021, 1 pg.
American Bag Company; Article entitled: "Cool Green Bag, Small", located at <http://hotcoldbags.com/items/Cool%20Green%20Bag,%20Small>, accessed on Mar. 20, 2017, 2 pgs.
Waltermire, Jamie; Notice of Allowance for U.S. Appl. No. 15/663,905, filed Jul. 31, 2017, dated Nov. 4, 2019, 18 pgs.
Waltermire, Jamie; Final Office Action for U.S. Appl. No. 15/663,905, filed Jul. 31, 2017, dated Aug. 22, 2019, 23 pgs.
Waltermire, Jamie; Non-Final Office Action for U.S. Appl. No. 15/663,905, filed Jul. 31, 2017, dated Jun. 25, 2019, 66 pgs.
Waltermire, Jamie; Requirement for Restriction/Election for U.S. Appl. No. 15/663,905, filed Jul. 31, 2017, dated Mar. 21, 2019, 8 pgs.
Waltermire, Jamie; Final Office Action for U.S. Appl. No. 16/381,678, filed Apr. 11, 2019, dated Oct. 19, 2020, 24 pgs.
Waltermire, Jamie; Final Office Action for U.S. Appl. No. 16/381,678, filed Apr. 11, 2019, dated Aug. 20, 2020, 21 pgs.
Waltermire, Jamie; Notice of Allowance for U.S. Appl. No. 16/381,678, filed Apr. 11, 2019, dated Jul. 30, 2020, 15 pgs.
Waltermire, Jamie; Final Office Action for U.S. Appl. No. 16/381,678, filed Apr. 11, 2019, dated Jun. 16, 2020, 8 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Advisory Action for U.S. Appl. No. 16/381,678, filed Apr. 11, 2019, dated Feb. 26, 2020, 3 pgs.
Waltermire, Jamie; Final Office Action for U.S. Appl. No. 16/381,678, filed Apr. 11, 2019, dated Dec. 30, 2019, 17 pgs.
Waltermire, Jamie; Non-Final Office Action for U.S. Appl. No. 16/381,678, filed Apr. 11, 2019, dated Sep. 9, 2019, 50 pgs.
Waltermire, Jamie; Corrected Notice of Allowance for U.S. Appl. No. 16/561,203, filed Sep. 5, 2019, dated Feb. 5, 2021, 8 pgs.
Waltermire, Jamie; Corrected Notice of Allowance for U.S. Appl. No. 16/561,203, filed Sep. 5, 2019, dated Jan. 5, 2021, 9 pgs.
Waltermire, Jamie; Notice of Allowance for U.S. Appl. No. 16/561,203, filed Sep. 5, 2019, dated Nov. 3, 2020, 14 pgs.
Waltermire, Jamie; Final Office Action for U.S. Appl. No. 16/561,203, filed Sep. 5, 2019, dated Sep. 10, 2020, 25 pgs.
Waltermire, Jamie; Non-Final Office Action for U.S. Appl. No. 16/561,203, filed Sep. 5, 2019, dated May 6, 2020, 59 pgs.
Waltermire, Jamie; Requirement for Restriction/Election for U.S. Appl. No. 16/561,203, filed Sep. 5, 2019, dated Feb. 26, 2020, 5 pgs.
Waltermire, Jamie; Non-Final Office Action for U.S. Appl. No. 16/689,407, filed Nov. 20, 2019, dated Jan. 8, 2021, 92 pgs.
Waltermire, Jamie; Requirement for Restriction/Election for U.S. Appl. No. 16/689,407, filed Nov. 20, 2019, dated Oct. 29, 2020, 6 pgs.
Waltermire, Jamie; Requirement for Restriction/Election for U.S. Appl. No. 16/689,433, filed Nov. 20, 2019, dated Oct. 16, 2020, 6 pgs.
Sollie, Greg; Corrected Notice of Allowance for U.S. Appl. No. 15/845,545, filed Dec. 18, 2017, dated Oct. 31, 2019, 12 pgs.
Sollie, Greg; Corrected Notice of Allowance for U.S. Appl. No. 15/845,545, filed Dec. 18, 2017, dated Oct. 1, 2019, 7 pgs.
Sollie, Greg; Notice of Allowance for U.S. Appl. No. 15/845,545, filed Dec. 18, 2017, dated Jun. 19, 2019, 20 pgs.
Sollie, Greg; Non-Final Office Action for U.S. Appl. No. 15/845,545, filed Dec. 18, 2017, dated Mar. 5, 2019, 41 pgs.
Sollie, Greg; Corrected Notice of Allowance for U.S. Appl. No. 16/552,277, filed Aug. 27, 2019, dated Feb. 9, 2021, 9 pgs.
Sollie, Greg; Corrected Notice of Allowance for U.S. Appl. No. 16/552,277, filed Aug. 27, 2019, dated Dec. 22, 2020, 7 pgs.
Sollie, Greg; Corrected Notice of Allowance for U.S. Appl. No. 16/552,277, filed Aug. 27, 2019, dated Nov. 5, 2020, 9 pgs.
Sollie, Greg; Notice of Allowance for U.S. Appl. No. 16/552,277, filed Aug. 27, 2019, dated Aug. 31, 2020, 6 pgs.

(56) References Cited

OTHER PUBLICATIONS

Sollie, Greg; Final Office Action for U.S. Appl. No. 16/552,277, filed Aug. 27, 2019, dated Aug. 7, 2020, 19 pgs.
Sollie, Greg; Non-Final Office Action for U.S. Appl. No. 16/552,277, filed Aug. 27, 2019, dated Jun. 3, 2020, 68 pgs.
Sollie, Greg; Restriction Requirement for U.S. Appl. No. 16/552,277, filed Aug. 27, 2019, dated Apr. 20, 2020, 7 pgs.
Sollie, Greg; Corrected Notice of Allowance for U.S. Appl. No. 15/845,540, filed Dec. 18, 2017, dated Feb. 12, 2021, 8 pgs.
Solie, Greg; Corrected Notice of Allowance for U.S. Appl. No. 15/845,540, filed Dec. 18, 2017, dated Dec. 21, 2020, 9 pgs.
Sollie, Greg; Notice of Allowance for U.S. Appl. No. 15/845,540, filed Dec. 18, 2017, dated Sep. 17, 2020, 5 pgs.
Sollie, Greg; Final Office Action for U.S. Appl. No. 15/845,540, filed Dec. 18, 2017, dated Sep. 2, 2020, 28 pgs.
Sollie, Greg; Non-Final Office Action for U.S. Appl. No. 15/845,540, filed Dec. 18, 2017, dated Feb. 19, 2020, 32 pgs.
Sollie, Greg; Final Office Action for U.S. Appl. No. 15/845,540, filed Dec. 18, 2017, dated Oct. 30, 2019, 56 pgs.
Sollie, Greg; Non-Final Office Action for U.S. Appl. No. 15/845,540, filed Dec. 18, 2017, dated Apr. 2, 2019, 50 pgs.
Waltermire, Jamie; Non-Final Office Action for U.S. Appl. No. 16/721,995, filed Dec. 20, 2019, dated Jul. 5, 2022, 28 pgs.
Waltermire, Jamie; Certificate of Correction for U.S. Appl. No. 16/293,716, filed Mar. 6, 2019, dated Aug. 30, 2022, 1 pg.
Waltermire, Jamie; Requirement for Restriction/Election for U.S. Appl. No. 17/497,057, filed Oct. 8, 2021, dated Sep. 15, 2022, 8 pgs.
Sollie, Greg; Non-Final Office Action for U.S. Appl. No. 16/951,454, filed Nov. 18, 2020, dated Aug. 4, 2022, 165 pgs.
Sollie, Greg; Final Office Action for U.S. Appl. No. 16/951,465, filed Nov. 18, 2020, dated Aug. 18, 2022, 20 pgs.
Sollie, Greg; Notice of Allowance for U.S. Appl. No. 17/100,819, filed Nov. 21, 2020, dated Sep. 7, 2022, 15 pgs.
Collison, Alan B.; Non-Final Office Action for U.S. Appl. No. 17/502,599, filed Oct. 15, 2021, dated Sep. 12, 2022, 12 pgs.
Collison, Alan B.; Non-Final Office Action for U.S. Appl. No. 17/834,999, filed Jun. 8, 2022, dated Sep. 12, 2022, 104 pgs.
Sollie, Greg; Non-Final Office Action for U.S. Appl. No. 16/280,595, filed 2/20/20219, dated Sep. 16, 2022, 14 pgs.
Sollie, Greg; Non-Final Office Action for U.S. Appl. No. 17/492,285, filed Oct. 1, 2021, dated Jul. 11, 2022, 109 pgs.
Sollie, Greg; Non-Final Office Action for U.S. Appl. No. 17/493,449, filed Oct. 4, 2021, dated Jul. 14, 2022, 110 pgs.
Sollie, Greg; Non-Final Office Action for U.S. Appl. No. 17/493,474, filed Oct. 4, 2021, dated Jul. 11, 2022, 112 pgs.
Collison, Alan B.; Examination Report for Australian patent application No. 2021204424, filed Nov. 7, 2017, dated Aug. 25, 2022, 8 pgs.
Collison, Alan B.; Extended European Search Report for application No. 22173063.3, filed Nov. 7, 2017, dated Sep. 9, 2022, 7 pgs.
Amazon. ECOOPTS Cling Wrap Plastic Food Wrap with Slide Cutter. First available Dec. 21, 2020. Visited Sep. 2, 2022. https://www.amazon.com/ECOOPTS-Cling-Plastic-Cutter-121 N %C3%971 000FT/dp/B08R3L7K4W/ (Year: 2020), 7 pgs.
Sollie, Greg; Notice of Allowance for Design U.S. Appl. No. 29/745,881, filed Aug. 10, 2020, dated Sep. 13, 2022, 12 pgs.
Waltermire, Jamie; Notice of Allowance for U.S. Appl. No. 17/079,437, filed Oct. 24, 2020, dated Jun. 2, 2022, 21 pgs.
Waltermire, Jamie; Final Office Action for U.S. Appl. No. 16/530,045, filed Aug. 2, 2019, dated Jun. 9, 2022, 20 pgs.
Waltermire, Jamie; Non-Final Office Action for U.S. Appl. No. 17/127,102, filed Dec. 18, 2020, dated Jun. 27, 2022, 128 pgs.
Waltermire, Jamie; Requirement for Restriction/Election for U.S. Appl. No. 17/127,102, filed Dec. 18, 2020, dated Apr. 14, 2022, 6 pgs.
Sollie, Greg; Restriction Requirement for U.S. Appl. No. 16/951,454, filed Nov. 18, 2020, dated Jun. 14, 2022, 6 pgs.
Sollie, Greg; Non-Final Office Action for U.S. Appl. No. 16/951,465, filed Nov. 18, 2020, dated May 13, 2022, 123 pgs.
Sollie, Greg; Final Office Action for U.S. Appl. No. 17/100,819, filed Nov. 21, 2020, dated Apr. 13, 2022, 39 pgs.
Sollie, Greg; Final Office Action for U.S. Appl. No. 16/280,595, filed Feb. 20, 2019, dated May 31, 2022, 27 pgs.
Sollie, Greg; Certificate of Correction for U.S. Appl. No. 17/187,239, filed Feb. 26, 2021, dated Apr. 26, 2022, 1 pg.
Sollie, Greg; Notice of Allowance for U.S. Appl. No. 17/185,616, filed Feb. 25, 2021, dated Jun. 17, 2022, 18 gs.
MP Global Products, LLC; Office Action for Canadian patent application No. 3,043,192, filed Nov. 7, 2017, dated Apr. 8, 2022, 9 pgs.
Any Custom Box. Perforated Dispenser Boxes. Publication date unavailable. Visited May 2, 2022. https://anycustombox.com/folding-cartons/perforated-dispenser-boxes/, 9 pgs.
Massage Warehouse. Cando@ Low Powder 100 Yard Perforated Dispenser. Publication date unavailable. Visited May 2, 2022. https://www.massagewarehouse.com/products/cando-perf-low-powder-1 DO-yd-dispenser/, 2 pgs.
Premier Storage. Oil & Fuel Absorbent Pads. Publication date unavailable. Visited May 2, 2022. https://www.premier-storage.co.uk/oil-and-fuel-absorbent-pads-bonded-and-perforated-double-weight.html, 1 pg.
Sollie, Greg; Notice of Allowance for Design U.S. Appl. No. 29/745,881, filed Aug. 10, 2020, dated May 9, 2022, 139 pgs.
Collison, Alan B.; Office Action for Chinese patent application No. 2021107289972, filed Nov. 7, 2017, dated May 7, 2022, 20 pgs.
Waltermire, Kamie; Non-Final Office Action for U.S. Appl. No. 17/127,102, filed Dec. 28, 2020, dated Jan. 12, 2023, 19 pgs.
Collison, Alan B.; Notice of Allowance for U.S. Appl. No. 17/502,599, filed Oct. 15, 2021, dated Jan. 23, 2023, 12 pgs.
Collison, Alan B.; Non-Final Office Action for U.S. Appl. No. 17/834,999, filed Jun. 8, 2022, dated Jan. 27, 2023, 28 pgs.
MP Global Products, LLC; Office Action for Canadian patent application No. 3,043,192, filed Nov. 7, 2017, dated Nov. 8, 2022, 3 pgs.
Waltermire, Jamie; Notice of Allowance for U.S. Appl. No. 16/721,995, filed Dec. 20, 2019, dated Dec. 5, 2022, 22 pgs.
Waltermire, Jamie; Advisory Action for U.S. Appl. No. 17/127,102, filed Dec. 18, 2020, dated Dec. 7, 2022, 4 pgs.
Sollie, Greg; Non-Final Office Action for U.S. Appl. No. 16/951,465, filed Nov. 18, 2020, dated Dec. 13, 2022, 17 pgs.
Collison, Alan B.; Applicant-Initiated Interview Summary for U.S. Appl. No. 17/688,356, filed Mar. 7, 2022, dated Dec. 28, 2022, 3 pgs.
Collison, Alan B.; Non-Final Office Action for U.S. Appl. No. 17/688,356, filed May. 7, 2022, dated Oct. 24, 2022, 41 pgs.
Collison, Alan B.; Examination Report for Australian patent application No. 2021204424, filed Nov. 7, 2017, dated Dec. 6, 2022, 2 pgs.
Collison, Alan B.; Office Action for Chinese patent application No. 2021107289972, filed Nov. 7, 2017, dated Nov. 23, 2022, 7 pgs.
Waltermire, Jamie; Certificate of Correction for U.S. Appl. No. 16/530,045, filed Aug. 2, 2019, dated Mar. 28, 2023, 1 pg.
Waltermire, Jamie; Notice of Allowance for U.S. Appl. No. 17/497,057, filed Oct. 8, 2021, dated Feb. 16, 2023, 25 pgs.
Sollie, Greg; Notice of Allowance for U.S. Appl. No. 16/951,465, filed Nov. 18, 2020, dated Feb. 28, 2023, 12 pgs.
Sollie, Greg; Certificate of Correction for U.S. Appl. No. 17/100,819, filed Nov. 21, 2020, dated Feb. 28, 2023, 2 pgs.
Collison, Alan B.; Final Office Action for U.S. Appl. No. 17/688,356, filed Mar. 7, 2022, dated Feb. 1, 2023, 21 pgs.
Sollie, Greg; Notice of Allowance for U.S. Appl. No. 16/280,595, filed Feb. 20, 2019, dated Mar. 31, 2023, 27 pgs.
Sollie, Greg; Notice of Allowance for U.S. Appl. No. 17/492,285, filed Oct. 1, 2021, dated Feb. 8, 2023, 25 pgs.
Sollie, Greg; Certificate of Correction for U.S. Appl. No. 17/185,616, filed Feb. 25, 2021, dated Feb. 28, 2023, 1 pg.
Sollie, Greg; Non-Final Office Action for U.S. Appl. No. 17/901,558, filed Sep. 1, 2022, dated Feb. 15, 2023, 128 pgs.
Sollie, Greg; Notice of Allowance for U.S. Appl. No. 17/307,650, filed May 4, 2021, dated Mar. 9, 2023, 15 pgs.

(56) References Cited

OTHER PUBLICATIONS

MP Global Products, L.L.C.; Examination Report for Australian patent application No. 2021245201, filed Nov. 7, 2017, dated Feb. 21, 2023, 3 pgs.
Waltermire, Jamie; Notice of Allowance for U.S. Appl. No. 16/530,045, filed Aug. 2, 2019, dated Oct. 5, 2022, 14 pgs.
Waltermire, Jamie; Applicant-Initiated Interview Summary for U.S. Appl. No. 17/127,102, filed Dec. 18, 2020, dated Oct. 31, 2022, 2 pgs.
Waltermire, Jamie; Final Office Action for U.S. Appl. No. 17/127,102, filed Dec. 18, 2020, dated Oct. 5, 2022, 31 pgs.
Waltermire, Jamie; Non-Final Office Action for U.S. Appl. No. 17/497,054, filed Oct. 8, 2021, dated Nov. 15, 2022, 131 pgs.
Waltermire, Jamie; Requirement for Restriction/Election for U.S. Appl. No. 17/497,054, filed Oct. 8, 2021, dated Oct. 6, 2022, 8 pgs.
Waltermire, Jamie; Non-Final Office Action for U.S. Appl. No. 17/497,057, filed Oct. 8, 2021, dated Oct. 19, 2022, 115 pgs.
Sollie, Greg; Notice of Allowance for U.S. Appl. No. 16/951,454, filed Nov. 18, 2020, dated Nov. 15, 2022, 13 pgs.
Sollie, Greg; Applicant-Initiated Interview Summary for U.S. Appl. No. 16/951,465, filed Nov. 18, 2020, dated Oct. 5, 2022, 2 pgs.
Collison, Alan B.; Applicant-Initiated Interview Summary for U.S. Appl. No. 17/502,599, filed Oct. 15, 2021, dated Oct. 27, 2022, 2 pgs.
Collison, Alan B.; Applicant-Initiated Interview Summary for U.S. Appl. No. 17/834,999, filed Jun. 8, 2022, dated Oct. 27, 2022, 2 pgs.
Collison, Alan B.; Restriction Requirement for U.S. Appl. No. 17/688,356, filed Mar. 7, 2022, dated Jun. 20, 2022, 9 pgs.
Sollie, Greg; Non-Final Office Action for U.S. Appl. No. 17/679,772, filed Feb. 24, 2022, dated Oct. 17, 2022, 108 pgs.
Sollie, Greg; Notice of Allowance for U.S. Appl. No. 17/493,449, filed Oct. 4, 2021, dated Oct. 13, 2022, 10 pgs.
Sollie, Greg; Notice of Allowance for U.S. Appl. No. 17/493,474, filed Oct. 4, 2021, dated Oct. 13, 2022, 15 pgs.
Sollie, Greg; Non-Final Office Action for U.S. Appl. No. 17/307,650, filed May 4, 2021, dated Nov. 30, 2022, 139 pgs.
Sollie, Greg; Requirement for Restriction/Election for U.S. Appl. No. 17/307,650, filed May 4, 2021, dated Oct. 28, 2022, 6 pgs.
MP Global Products, LLC; Extended European Search Report for application No. 22152100.8, dated Jun. 2, 2022, 7 pgs.
Waltermire, Jamie; Final Office Action for U.S. Appl. No. 17/497,054, filed Oct. 8, 2021, dated Apr. 24, 2023, 33 pgs.
Sollie, Greg; Notice of Allowance for U.S. Appl. No. 16/951,454, filed Nov. 18, 2020, dated May 2, 2023, 6 gs.
Collison, Alan B.; Certificate of Correction for U.S. Appl. No. 17/502,599, filed Oct. 15, 2021, dated Jun. 6, 2023, 1 pg.
Collison, Alan B.; Notice of Allowance for U.S. Appl. No. 17/834,999, filed Jun. 8, 2022, dated May 18, 2023, 14 pgs.
Collison, Alan B.; Advisory Action for U.S. Appl. No. 17/688,356, filed Mar. 7, 2022, dated Apr. 26, 2023, 7 pgs.
Collison, Alan B.; Applicant-Initiated Interview Summary for U.S. Appl. No. 17/688,356, filed Mar. 7, 2022, dated Apr. 6, 2023, 3 pgs.
Sollie, Greg; Non-Final Office Action for U.S. Appl. No. 17/679,772, filed Feb. 24, 2022, dated May 2, 2023, 29 pgs.
Sollie, Greg; Non-Final Office Action for U.S. Appl. No. 17/536,878, filed Nov. 29, 2021, dated Apr. 12, 2023, 140 pgs.
Sollie, Greg; Non-Final Office Action for U.S. Appl. No. 18/094,806, filed Jan. 9, 2023, dated Apr. 21, 2023, 118 pgs.
Sollie, Greg; Non-Final Office Action for U.S. Appl. No. 18/095,310, filed Jan. 10, 2023, dated Apr. 24, 2023, 118 pgs.
Anagnostopoulos, John; Non-Final Office Action for U.S. Appl. No. 17/666,206, filed Feb. 7, 2022, dated Apr. 19, 2023, 139 pgs.
Collison, Alan B.; Office Action for Chinese patent application No. 2021107289972, filed Nov. 7, 2017, dated Apr. 15, 2023, 7 pgs.
Waltermire, Jamie; Non-Final Office Action for U.S. Appl. No. 17/127,060, filed Dec. 18, 2020, dated Jun. 21, 2023, 159 pgs.
Waltermire, Jamie; Final Office Action for U.S. Appl. No. 17/127,102, filed Dec. 18, 2020, dated Jul. 6, 2023, 35 pgs.
Waltermire, Jamie; Non-Final Office Action for U.S. Appl. No. 17/497,054, filed Oct. 8, 2021, dated Aug. 3, 2023, 24 pgs.
Sollie, Greg; Certificate of Correction for U.S. Appl. No. 16/951,465, filed Nov. 18, 2020, dated Aug. 1, 2023, 1 pg.
Collison, Alan B.; Advisory Action for U.S. Appl. No. 17/688,356, filed Mar. 7, 2022, dated Jul. 25, 2023, 6 pgs.
Collison, Alan B.; Non-Final Office Action for U.S. Appl. No. 17/688,356, filed Mar. 7, 2022, dated Jul. 31, 2023, 18 pgs.
Sollie, Greg; Final Office Action for U.S. Appl. No. 17/901,558, filed Sep. 1, 2022, dated Aug. 21, 2023, 25 bgs.
Sollie, Greg; Certificate of Correction for U.S. Appl. No. 17/493,449, filed Oct. 4, 2021, dated Aug. 15, 2023, 1 pg.
Sollie, Greg; Notice of Allowance for U.S. Appl. No. 18/094,806, filed Jan. 9, 2023, dated Jul. 21, 2023, 12 pgs.
Sollie, Greg; Certificate of Correction for U.S. Appl. No. 17/493,474, filed Oct. 4, 2021, dated Aug. 1, 2023, 3 pgs.
Sollie, Greg; Notice of Allowance for U.S. Appl. No. 18/095,310, filed Jan. 10, 2023, dated Jul. 28, 2023, 19 ogs.
Waltermire, Jamie; Non-Final Office Action for U.S. Appl. No. 17/891,565, filed Aug. 19, 2022, dated Sep. 6, 2023, 115 pgs.
Waltermire, Jamie; Requirement for Restriction/Election for U.S. Appl. No. 17/173,293, filed Feb. 11, 2021, dated Aug. 30, 2023, 6 pgs.
Waltermire, Jamie; Final Office Action for U.S. Appl. No. 17/127,060, filed Dec. 18, 2020, dated Oct. 19, 2023, 44 pgs.
Waltermire, Jamie; Notice of Allowance for U.S. Appl. No. 17/127,102, filed Dec. 18, 2020, dated Oct. 20, 2023, 10 pgs.
Waltermire, Jamie; Certificate of Correction for U.S. Appl. No. 17/497,057, filed Oct. 8, 2021, dated Sep. 5, 2023, 1 pg.
Solie, Greg; Certificate of Correction for U.S. Appl. No. 16/280,595, filed Feb. 20, 2019, dated Sep. 12, 2023, 2 pgs.
Sollie, Greg; Notice of Allowance for U.S. Appl. No. 17/679,772, filed Feb. 24, 2022, dated Aug. 30, 2023, 12 pgs.
Sollie, Greg; Final Office Action for U.S. Appl. No. 17/536,878, filed Nov. 29, 2021, dated Oct. 20, 2023, 29 pgs.
Anagnostopoulos, John; Final Office Action for U.S. Appl. No. 17/666,206, filed Feb. 7, 2022, dated Oct. 2, 2023, 32 pgs.
paperweb.com, 2006, downloaded online Sep. 26, 2023 from archive.org (Year: 2006), 1 pg.
Sollie, Greg; Examination Report for Australian application No. 2018260918, filed Nov. 8, 2018, dated Oct. 13, 2023, 5 pgs.
Sollie, Greg; Examination Report for Australian patent application No. 2018260919, filed Nov. 8, 2018, dated Oct. 16, 2023, 4 pgs.

* cited by examiner

INSULATED BOX

CROSS-REFERENCE TO RELATED APPLICATIONS

This application is a divisional of U.S. application Ser. No. 15/590,349, filed May 9, 2017, which is hereby incorporated by reference herein in its entirety.

JOINT RESEARCH AGREEMENT

The subject matter disclosed was developed and the claimed invention was made by, or on behalf of, one or more parties to a joint research agreement between MP Global Products LLC of Norfolk, NE and Pratt Retail Specialties, LLC of Conyers, GA, that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to an insulated box.

BACKGROUND

Packaging perishable or temperature sensitive contents for storage or shipping can pose challenges. The contents can spoil, destabilize, freeze, melt, or evaporate during storage or shipping if the temperature of the contents is not maintained or the packaging is not protected from hot or cold environmental conditions. Contents such as food, pharmaceuticals, electronics, or other temperature sensitive items can be damaged if exposed to temperature extremes. Many insulated packages are bulky and difficult to store prior to use. Additionally, many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an insulated box comprising a box, the box comprising a bottom panel and a side panel, the side panel attached to the bottom panel; and an insulated panel attached to the side panel, the insulated panel comprising an insulation batt and a sheet, the insulation batt enclosed between the side panel and the sheet.

Also disclosed is an insulated box assembly comprising an insulated box, the insulated box comprising a box, the box comprising a bottom panel and a side panel, the side panel attached to the bottom panel, the box defining a box cavity; and an insulated panel attached to the side panel, the insulated panel comprising an insulation batt and a sheet, the insulation batt enclosed between the side panel and the sheet; and an insulated cavity panel, the insulated cavity panel disposed within the box cavity, the insulated cavity panel comprising a cavity sheet and a cavity insulation batt, the cavity sheet encapsulating the cavity insulation batt.

Also disclosed is a method for insulating a box, the method comprising positioning an insulated panel adjacent to a side panel of the box, the insulated panel comprising an insulation batt and a sheet, the insulated panel defining a border extending around a perimeter of the insulation batt; and attaching a seam of the border to a portion of a perimeter area of the side panel.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
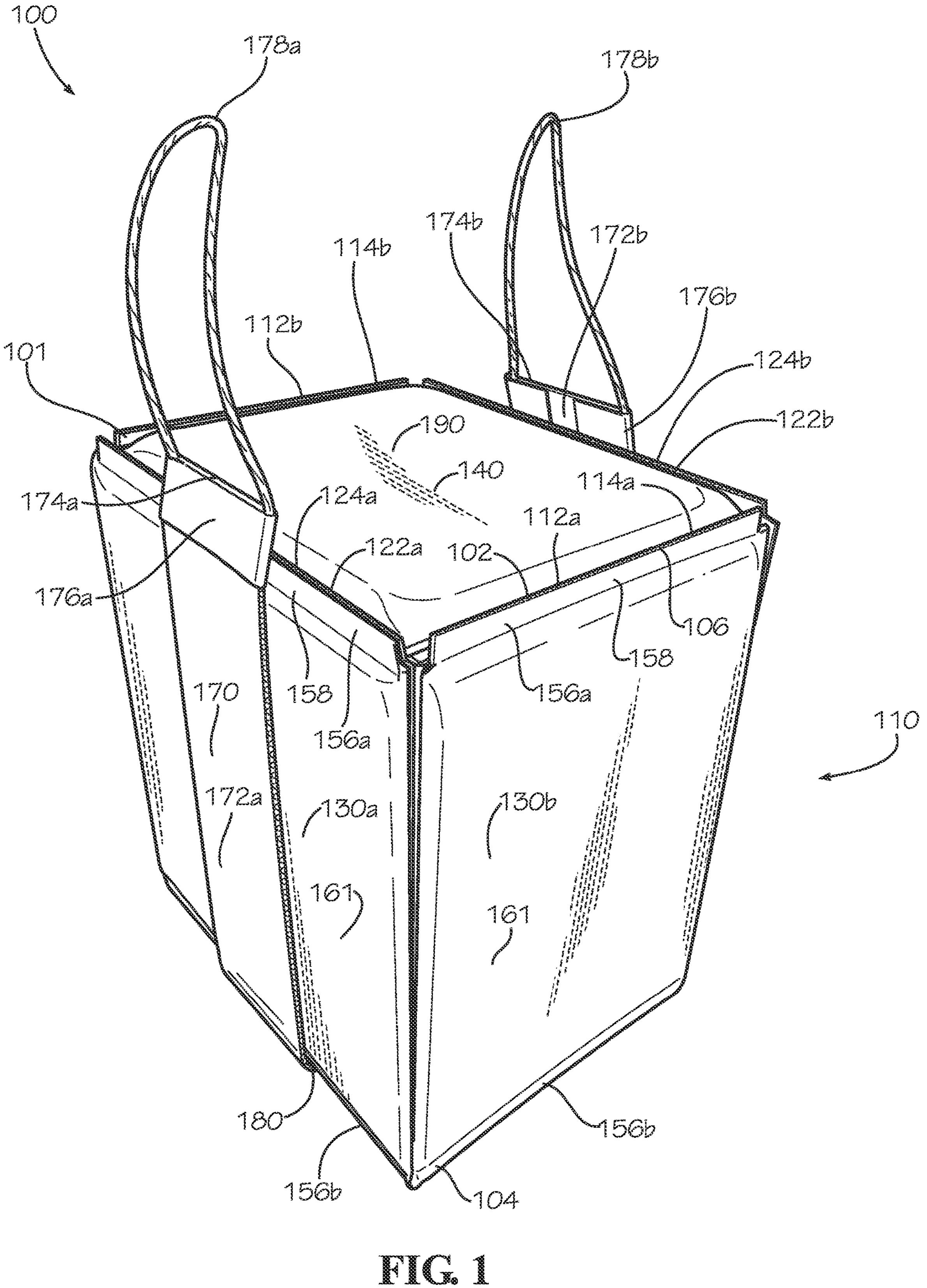
FIG. 1 is a perspective view of an insulated box assembly comprising an insulated box, a box top, and a carrying accessory in accordance with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an insulated box assembly and associated methods, systems, devices, and various apparatus. The insulated box assembly comprises an insulated box, a box top, and a carrying accessory. It would be understood by one of skill in the art that the disclosed insulated box assembly is described in but a few exemplary embodiments among many. No particular terminology or description should be considered limiting on the disclosure or the scope of any claims issuing therefrom.

FIG. 1 is a perspective view of an insulated box assembly 100 in a closed position in accordance with one aspect of the present disclosure. The insulated box assembly 100 can comprise an insulated box 110, a carrying accessory 170, and a box top 190. The insulated box 110 can comprise a box 101 and a plurality of insulated panels 130*a-d* (insulated panels 130*c,d* shown in FIG. 3). The box 101 can comprise a rigid board material such as corrugated cardboard; however in other aspects, the box 101 can comprise other suitable rigid board materials, such as wood, plastic, metal, or any other material.

The box 101 can comprise a first pair of opposing side panels 112*a,b* and a second pair of opposing side panels 122*a,b*. The side panels 112*a,b*,122*a,b* can each be a rigid panel. The side panel 112*a* can be substantially parallel to the side panel 112*b*, and the side panel 122*a* can be substantially parallel to the side panel 122*b*. Each side panel 112*a,b* can be substantially perpendicular to both side panels 122*a,b*. The box 101 can define a rectangular or square cross-sectional shape; however, in other aspects, the box 101 can define a different cross-sectional shape such as a circular, triangular, pentagonal, or hexagonal, shape or any other desired shape.

The box 101 can define a top end 102 and a bottom end 104, and the top end 102 can be disposed opposite from the bottom end 104. The side panels 112*a,b* can define lips 114*a,b*, respectively, disposed proximate to the top end 102 of the insulated box 110. The side panels 122*a,b* can define lips 124*a,b*, respectively, disposed proximate to the top end 102 of the insulated box 110. The box 101 can define a box opening 106 at the top end 102. The box top 190 can be sized and shaped to fit between the lips 114*a,b* and the lips 124*a,b* to cover the box opening 106 when the insulated box 110 is in the closed position. The box top 190 can comprise an insulated panel 140 which can be substantially identical in construction to the insulated panels 130*a-d*; however in other aspects, the insulated panel 140 can differ in construction from the insulated panels 130*a-d*.

The insulated panels 130*a-d* can be attached to the side panels 112*a,b*,122*a,b*. The insulated panels 130*a,c* (130*c* shown in FIG. 3) can be respectively attached to the side panels 112*a,b*, and the insulated panels 130*b,d* (130*d* shown in FIG. 3) can be respectively attached to the side panels 122*a,b*. Each insulated panel 130*a-d* can define a border 158 extending around the respective insulated panel 130*a-d*. An area encircled by the border 158 can define an insulated portion 161 of the respective insulated panel 130.

The border 158 of each insulated panel 130*a-d* can define a top seam 156*a* and a bottom seam 156*b* extending outwards from the insulated portion 161 of the respective insulated panel 130*a-d*. The top seam 156*a* can be attached to the adjacent side panel 112*a,b*,122*a,b* of the box 101 proximate the top end 102 of the box 101. In the present aspect, the top seam 156*a* of each insulated panel 130*a-d* can attach to the lip 114*a,b*,124*a,b* of the adjacent side panel 112*a,b*,122*a,b*. The bottom seam 156*b* of each insulated panel 130*a-d* can be attached to the adjacent side panel 112*a,b*,122*a,b* along the bottom end 104 of the box 101. The seams 156*a,b* can be attached by an adhesive such as a glue, cement, epoxy, mastic, double-sided tape, cohesive, or any other suitable material, and the seams 156*a,b* can secure the insulated panels 130*a-d* to the respective adjacent side panels 112*a,b*,122*a,b*.

The carrying accessory 170 can extend beneath the insulated box 110 to facilitate hand carrying of the insulated box 110. The carrying accessory 170 can define a U-shape. A middle portion 180 can extend beneath the insulated box 110. A first side portion 172*a* can extend upwards from the middle portion 180 and can be adjacent to the insulated panel 130*a*. A second side portion 172*b* can extend upwards from the middle portion 180 and can be adjacent to the insulated panel 130*c* (shown in FIG. 3).

In the present aspect, the carrying accessory 170 can be attached to the insulated box 110 such as with an adhesive, such as a glue, cement, epoxy, mastic, double-sided tape, cohesive, or any other suitable material. In other aspects, the carrying accessory 170 can be mechanically attached, such as with a hook-and-loop fastener, stitching, or staples, and the mechanical attachment of the carrying accessory 170 can be configured to be selectively attached and detached from the insulated box 110 such as with hook-and-loop fasteners. In other aspects, the carrying accessory 170 may not be attached to the insulated box 110. In some aspects, the side portions 172*a,b* can extend upwards adjacent to the insulated panels 130*b,d*. In some aspects, the carrying accessory 170 can have four side portions (not shown), and one side portion can be positioned adjacent to each of the four insulated panels 130*a-d*.

The side portions 172*a,b* can respectively define handles 178*a,b*. In the present aspect, handle 178*a* can be attached to an end 174*a* of the first side portion 172*a* by a base strip 176*a*. Handle 178*b* can be attached to an end 174*b* of the second side portion 172*b* by a base strip 176*b*. The handles 178*a,b* can comprise twisted paper rope, and the handles 178*a,b* can be laminated between two layers of the respective base strip 176*a,b*. In other aspects, the handles 178*a,b* can be integrally formed with the base strips 176*a,b*, and the handles 178*a,b* and the base strips 176*a,b* can comprise a common material. For example, the base strips 176*a,b* and the handles 178*a,b* can comprise a heavy kraft paper, plastic, posterboard, cardboard, or other suitable material. In other aspects, the handles 178*a,b* can comprise a fiber such as cotton, hemp, jute, or bamboo fiber.

The base strips 176*a,b* can be attached to the respective ends 174*a,b* with an adhesive such as a glue, cement, epoxy, mastic, double-sided tape, cohesive, or any other suitable material. The ends 174*a,b* and the handles 178*a,b* can extend upwards above the box opening 106. In other aspects, the handles 178*a,b* and the ends 174*a,b* may not extend above the box opening 106, and the handles 178*a,b* can be positioned adjacent to the insulated panels 130*b,d*. In other aspects, the handles 178*a,b* can have a different shape and can be attached directly to the respective side portions 172*a,b*. In some aspects, the handles 178*a,b* can be formed integrally with the respective side portions 172*a,b*, for example, by cutting a hand hole through the respective side portion 172*a,b*.

Figure 2:
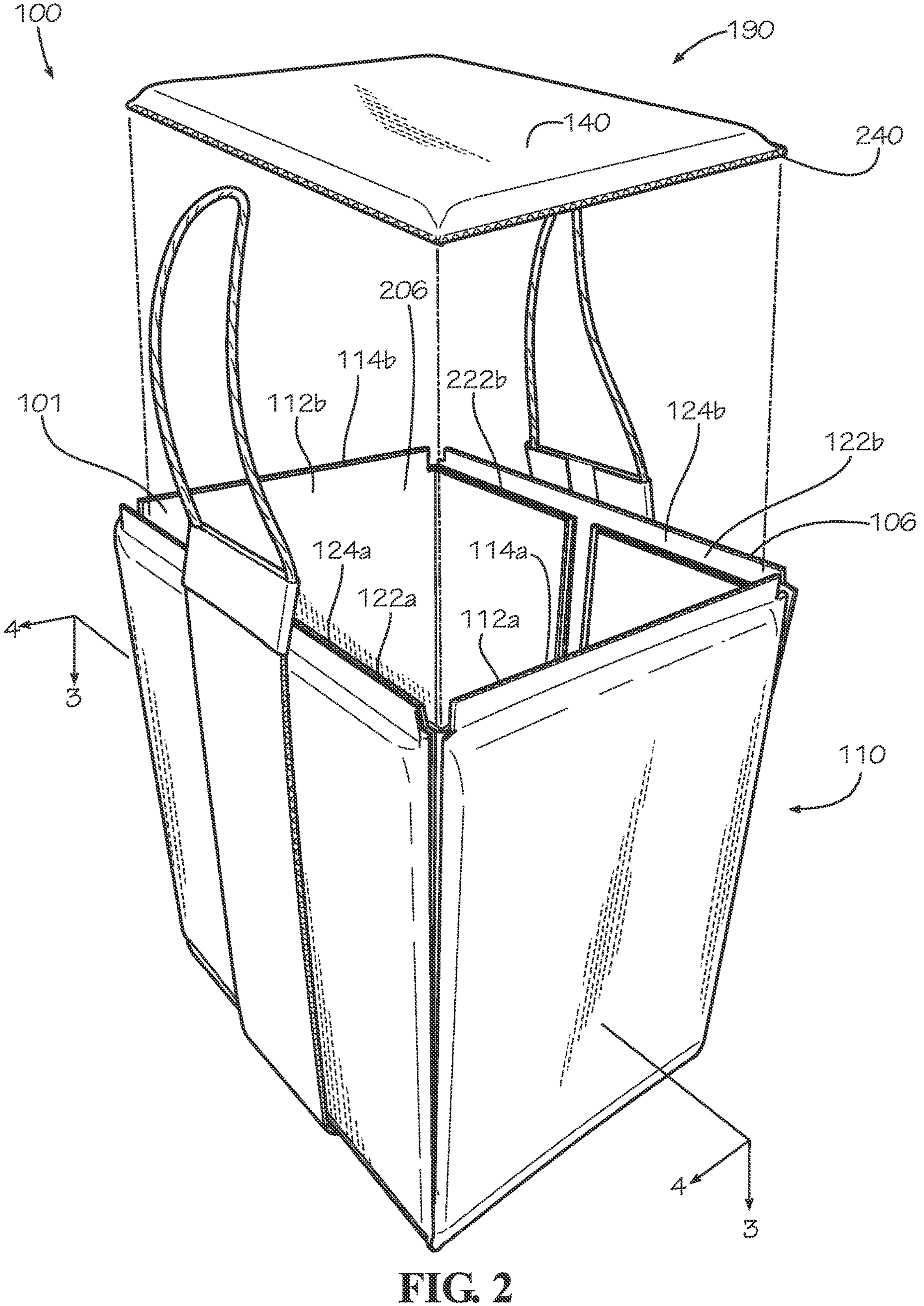
FIG. 2 is a perspective view of the insulated box assembly of FIG. 1 with the insulated box in an open position.

FIG. 2 is a perspective view of the insulated box assembly 100 of FIG. 1 with the box top 190 in an open position. In the open position, the box top 190 can be removed from the box opening 106, thereby exposing a box cavity 206 defined within the box 101. The first pair of opposing side panels 112*a,b* and the second pair of opposing side panels 122*a,b* of the box 101 can define the box cavity 206. A pair of shoulders 222*a,b* can extend inwards into the box cavity 206 from each of the side panels 122*a,b*, as represented by the shoulder 222*b* (shoulder 222*a* shown in FIG. 3). The shoulders 222*a,b* are configured to support the box top 190 when the box top 190 is positioned between the lips 114*a,b*,124*a,b* in the closed position. In the closed position, the box top 190 can cover the box opening 106 and enclose the box cavity 206.

In the present, aspect, the box top 190 can comprise the insulated panel 140 and a top panel 240. The top panel 240 can be a rigid panel. The insulated panel 140 can be attached to the top panel 240 and positioned atop the top panel 240 as shown. In other aspects, the box top 190 can be flipped, and the insulated panel 140 can be positioned beneath the top panel 240. In other aspects, the box top 190 can comprise a second insulated panel (not shown), and the box top 190 can be insulated on both sides for added insulation value. In other aspects, the box top 190 may not comprise the insulated panel 140, and the top panel 240 can be uninsulated. The top panel 240 can comprise corrugated cardboard in the present aspect; however, in other aspects the top panel 240 can be comprise a suitable rigid board material such as wood, plastic, metal, or any other material.

Figure 3:
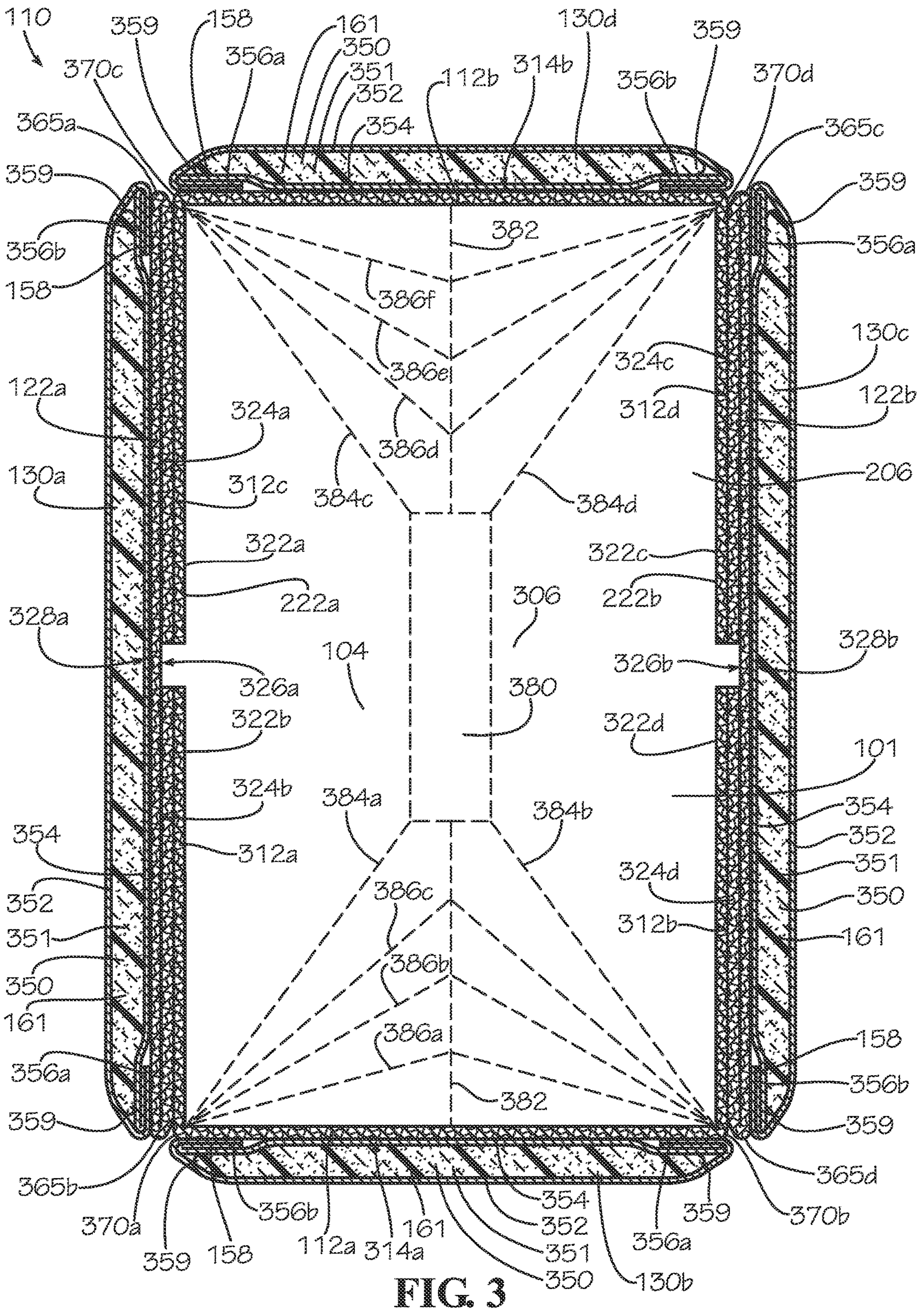
FIG. 3 is a cross-section of the insulated box of FIG. 1 taken along line 3-3 shown in FIG. 2.

FIG. 3 is a cross-section of the insulated box 110 of FIG. 1 taken along line 3-3 shown in FIG. 2, with the carrying accessory 170 and the box top 190 removed. As shown, each shoulder 222*a,b* can comprise two sub-shoulders 322. The shoulder 222*a* can comprise the sub-shoulders 322*a,b*, and the shoulder 222*b* can comprise the sub-shoulders 322*c,d*. The sub-shoulders 322*a-d* can be defined by a plurality of first wings 312*a-d* and a plurality of second wings 324*a-d*. The first wings 312*a,b* can be attached at opposite sides of the side panel 112*a*, and the first wings 312*c,d* can be attached at opposite sides of the side panel 112*b*. The second wings 324*a,b* can be attached at opposite sides of the side panel 122*a*, and the second wings 324*c,d* can be attached at opposite sides of the side panel 122*b*.

The second wing 324*a* can be folded inwards at a hinge 365*a* and positioned adjacent to an inner side surface 326*a* defined by the side panel 122*a*, and the first wing 312*c* can be folded at a hinge 370*c* and positioned adjacent to the second wing 324*a*. The second wing 324*a* and the first wing 312*c* can be secured in position, such as with an adhesive, to form the sub-shoulder 322*a*. The second wing 324*b* can be folded inwards at a hinge 365*b* and positioned adjacent to the inner side surface 326*a*, and the first wing 312*a* can be folded at a hinge 370*a* and positioned adjacent to the second wing 324*b*. The second wing 324*b* and the first wing 312*a* can be secured in position, such as with an adhesive, to form the sub-shoulder 322*b*.

For the sub-shoulder 322*c* of shoulder 222*b*, the second wing 324*c* can be folded inward at a hinge 365*c* and positioned adjacent to an inner side surface 326*b* defined by the side panel 122*b*. The first wing 312*d* can then be folded at a hinge 370*d* and positioned adjacent to the second wing 324*c*. The first wing 312*d* and the second wing 324*c* can be secured in position, such as with an adhesive, to form the sub-shoulder 322*c*. For the sub-shoulder 322*d* of shoulder 222*b*, the second wing 324*d* can be folded inward at a hinge 365*d* and positioned adjacent to the inner side surface 326*b*. The first wing 312*b* can then be folded at a hinge 370*b* and positioned adjacent to the second wing 324*d*. The first wing 312*b* and the second wing 324*d* can be secured in position, such as with an adhesive, to form the sub-shoulder 322*d*.

The formation of the sub-shoulders 322*a-d* can also secure each side panel 112*a,b* to each side panel 122*a,b*, thereby defining the square or rectangular horizontal cross-section of the box 101. The box 101 can further comprise a bottom panel 306. The bottom panel 306 can be a rigid panel. The bottom panel 306 can be disposed at the bottom end 104 of the box 101, and the bottom panel 306 can be attached to each of the side panels 112*a,b*,122*a,b*. The bottom panel 306 can further define the box cavity 206. The box 101 is but one example of a box, and the methods discussed below for insulating the box 101 to form the insulated box 110 can be applied to a box of another shape, size, or form.

In the present aspect, the bottom panel 306 can define a center subpanel 380 disposed at a center of the bottom panel 306. The center subpanel 380 can be substantially rectangular in shape. A center fold line 382 can extend between the center subpanel 380 and each side panel 112*a,b*, and the center fold line 382 can substantially bisect the bottom panel 306, with the exception of within the center subpanel 380. The center fold line 382 can also bisect each side panel 112*a,b*, as shown and further described with respect to FIG. 7. Four corner fold lines 384*a-d* can extend between the corners of the center subpanel 380 and the hinges 370*a-d*. The corner fold line 384*a* can extend from the hinge 370*a* to the center subpanel 380. The corner fold line 384*b* can extend from the hinge 370*b* to the center subpanel 380. The corner fold line 384*c* can extend from the hinge 370*c* to the center subpanel 380. The corner fold line 384*d* can extend from the hinge 370*d* to the center subpanel 380.

A plurality of V-shaped fold lines 386*a-f* can extend between the hinges 370*a-d* and the center fold line 382. The V-shaped fold lines 386*a-c* can each extend from the hinge 370*a* to center fold line 382 and then to the hinge 370*b*. The V-shaped fold lines 386*a-c* can be defined between the corner fold lines 384*a* and 384*b*. The V-shaped fold lines 386*d-f* can each extend from the hinge 370*c* to center fold line 382 and then to the hinge 370*d*. The V-shaped fold lines 386*d-f* can be defined between the corner fold lines 384*c* and 384*d*. The center subpanel 380, the center fold line 382, the corner fold lines 384*a-d*, and the V-shaped fold lines 386*a-f* can cooperate to collapse the insulated box 110 and to provide the bottom panel 306 with a truncated pyramidal shape when collapsed, as further discussed below with respect to FIG. 8.

The box 101 of the insulated box 110 can be clad with the insulated panels 130*a-d*. The insulated panel 130*a* can be attached to an outer side surface 328*a* defined by the side panel 122*a*. The insulated panel 130*b* can be attached to an outer side surface 314*a* defined by the side panel 112*a*. The insulated panel 130*c* can be attached to an outer side surface 328*b* defined by the side panel 122*b*. The insulated panel 130*d* can be attached to an outer side surface 314*b* defined by the side panel 112*b*. In the present aspect, the box 101 can be externally clad with the insulated panels 130*a-d*, however in other aspects, the box 101 can be internally clad, both internally and externally clad, or a mixed arrangement of partially internally clad and partially externally clad with insulated panels 130.

In the present aspect, each insulated panel 130*a-d* can comprise an insulation batt 350, a first sheet 352, and a second sheet 354. The insulation batt 350 can be encapsulated in a panel cavity 351 defined between the first sheet 352 and the second sheet 354. The insulation batt 350 can be encapsulated by the border 158 which can extend around a perimeter 359 of the insulation batt 350, thereby sealing the panel cavity 351. The panel cavity 351 containing the insulation batt 350 can define the insulated portion 161 of the respective insulated panel 130*a-d*. The border 158 can be a seam formed by attaching a perimeter portion of the first sheet 352 which overhangs the perimeter 359 of the insulation batt 350 with a perimeter portion of the second sheet 354 which also overhangs the perimeter 359 of the insulation batt 350. The first sheet 352 can be attached to the second sheet 354 with an adhesive such as a glue, cement, epoxy, mastic, cohesive, double-side tape or other suitable adhesive to form the border 158. In some aspects, the border 158 can be formed by mechanically fastening the first sheet 352 to the second sheet 354, such as by stapling, stitching, or any other suitable method of fastening.

The border 158 can further define a first side seam 356*a* and a second side seam 356*b*. In the present aspect, the first side seam 356*a* and the second side seam 356*b* can be vertically oriented seams. The first side seam 356*a* and the second side seam 356*b* of the border 158 can be folded inwards and disposed between the insulation batt 350 of the insulated portion 161 and the outer side surface 328*a,b* of the respective side panels 122*a,b* or the outer side surfaces 314*a,b* of the respective side panels 112*a,b*. The first side seam 356*a* and the second side seam 356*b* can be attached to the adjacent side panel 112*a,b*,122*a,b*, thereby further securing the insulated panel 130*a-d* to the adjacent side panel 112*a,b*,122*a,b* and enclosing the insulation batt 350 between the first sheet 352 and the adjacent side panel 112*a,b*,122*a,b*. By folding the first side seam 356*a* and the second side seam 356*b* inwards, the insulation batt 350 and the insulated portion 161 can extend completely across or nearly completely across the width of the adjacent side panel 112*a,b*,122*a,b* without leaving the first side seam 356*a* and the second side seam 356*b* sticking outwards beyond the side panel 112*a,b*,122*a,b*. This configuration can provide full insulation or nearly full insulation over the width of the adjacent side panel 112*a,b*,122*a,b*.

With the first side seam 356*a* and the second side seam 356*b* folded inwards, the first sheet 352 can be attached to the respective adjacent side panel 112*a,b*,122*a,b* with an adhesive such as a glue, cement, epoxy, mastic, double-sided tape, cohesive, or other suitable material. A portion of the second sheet 354 extending between the first side seam 356*a* and the second side seam 356*b* can also be in facing contact with the adjacent side panel 112*a,b*,122*a,b* and can optionally be attached with the adhesive. In other aspects, the insulated panels 130*a-d* may not comprise the second sheet 354, and either the insulation batt 350 can be in facing contact with the respective adjacent side panel 112*a,b*,122*a, b*, or the first sheet 352 can fully encapsulate the insulation batt 350.

Figure 4:
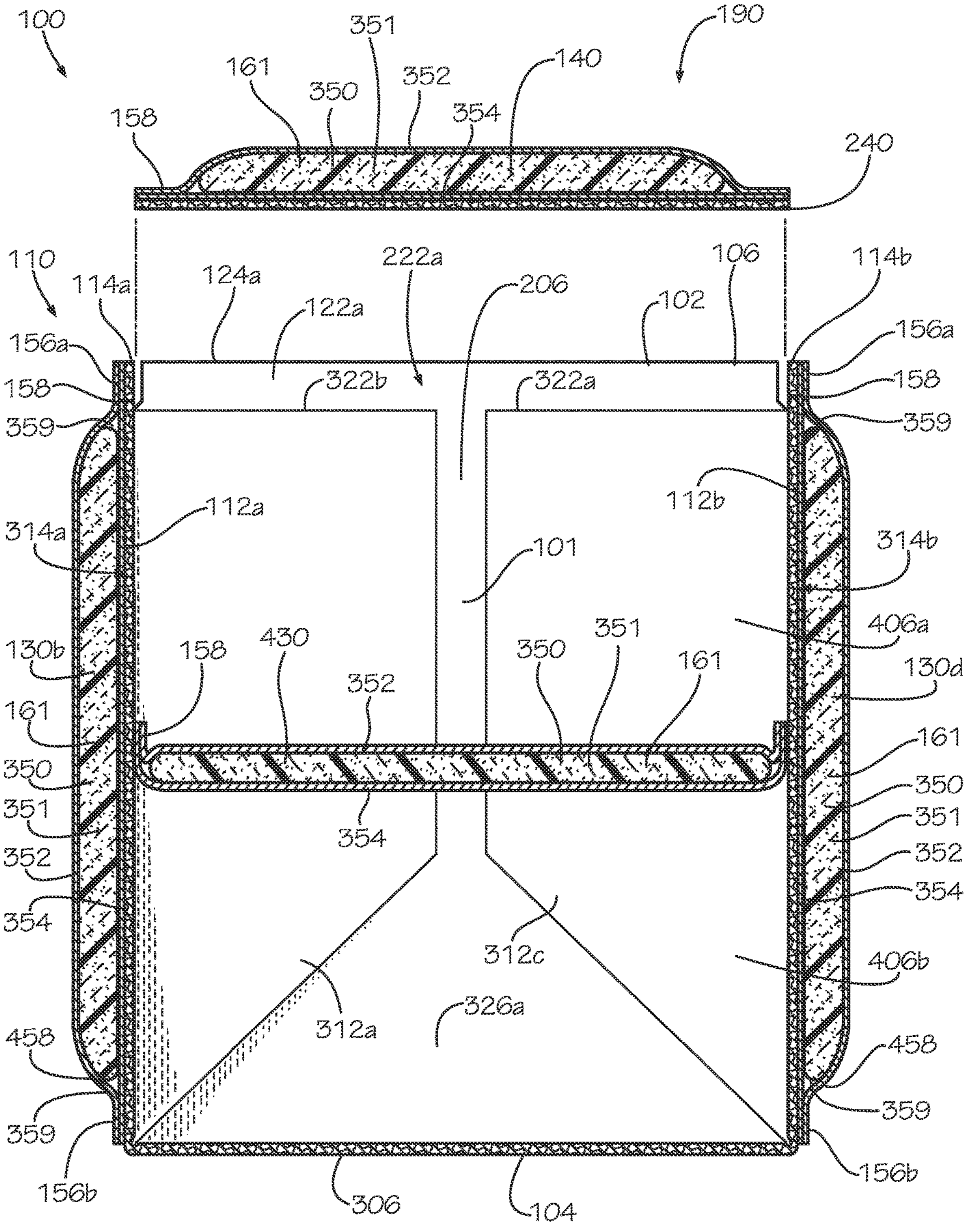
FIG. 4 is a cross-section of the insulated box assembly of FIG. 1 taken along line 4-4 shown in FIG. 2.

FIG. 4 is a cross-section of the insulated box assembly 100 of FIG. 1 taken along line 4-4 shown in FIG. 2. In the present view, the carrying accessory 170 has been removed. The insulated box assembly 100 can further comprise an insulated cavity panel 430 which can be disposed within the box cavity 206. The insulated cavity panel 430 can be constructed similar to the insulated panels 130*a-d*,190; however, in the present aspect, the insulated cavity panel 430 can be a loose panel. The insulated portion 161 of the insulated cavity panel 430 can be shaped and sized complimentary to the horizontal cross-section of the box 101 in order to provide a close fit within the box cavity 206.

As shown, the insulated cavity panel 430 can divide the box cavity 206 into a first sub-compartment 406*a* and a second sub-compartment 406*b*. In the present aspect, the insulated cavity panel 430 can be horizontally oriented, and the first sub-compartment 406*a* can be an upper sub-compartment while the second sub-compartment 406*b* can be a lower sub-compartment. In other aspects, the insulated cavity panel 430 can be vertically oriented to divide the box cavity 206 into side-by-side compartments. In some aspects, the insulated box 110 can comprise multiple cavity panels 430 disposed within the box cavity 206 to divide the box cavity 206 into more than two compartments or no cavity panels 430 so that the box cavity 206 is a single compartment. Dividing the box cavity 206 into sub-compartments can be desirable in order to package both hot and cold contents in the same insulated box 110 or other contents that should be stored at different temperatures.

In the present aspect, the bottom panel 306 can be uninsulated. Optionally, the insulated cavity panel 430 can be placed atop the bottom panel 306 to provide insulation for the bottom end 104 of the insulated box 110. In other aspects, the insulated box 110 can further comprise another insulated panel 130 (not shown) attached internally or externally to the bottom panel 306. In aspects in which the box top 190 can be uninsulated, the insulated cavity panel 430 can be positioned adjacent to the box top 190 to provide insulation for the top end 102 of the insulated box 110. In some aspects, the bottom panel 306 can be insulated and the insulated cavity panel 430 can be placed atop the bottom panel 306 in order to provide additional insulation for example. In some aspects, the insulated box assembly 100 can comprise multiple insulated cavity panels 430 positioned within the box cavity 206.

The bottom seam 156*b* and the top seam 156*a* of the border 158 of each insulated panel 130*a-d* can extend outwards from the perimeter 359 of the insulation batt 350 and the insulated portion 161. As previously discussed, the bottom seams 156*b* and the top seams 156*a* can be attached to the respective adjacent side panel 112*a,b*,122*a,b* with the adhesive in order to secure the insulated panels 130*a-d*, to the box 101 proximate the top end 102 and the bottom end 104. In such aspects, the second sheet 354 can be attached to the adjacent side panel 112*a,b*,122*a,b*, and the first sheet 352 may not contact the adjacent side panel 112*a,b*,122*a,b* at the bottom seam 156*b* and the top seam 156*a*; however, the insulation batt 350 remains enclosed between the first sheet 352 and the adjacent side panel 112*a,b*,122*a,b*. Optionally, portions of the second sheet 354 disposed between the top seams 156*a* and the bottom seam 156*b* can also be attached to the respective adjacent side panel 112*a,b*,122*a,b* with the adhesive.

The outward extending top seams 156*a* can leave the lips 114*a,b*,124*a,b* uninsulated; however, because the box top 190 rests below the box opening 106 on the shoulders 222*a,b* (should 222*b* shown in FIG. 3), the top end 102 of the insulated box 110 can remain fully insulated. Similarly, the bottom seams 156*b* can leave a portion of the side panels 112*a,b*,122*a,b* proximate the bottom panel 306 uninsulated. However, in aspects in which the insulated cavity panel 430 can be positioned atop the bottom panel 306, the insulated cavity panel 430 can fully insulate the bottom end 104 of the insulated box 110. In other aspects, either or both of the bottom seams 156*b* and top seams 156*a* can be folded inward towards the insulation batt 350 and the insulated portion 161, and the insulation batt 350 can fully cover the height of the side panels 112*a,b*,122*a,b*.

The outwardly extended bottom seams 156*b* can define a bottom taper 458 extending around the insulated box 110 proximate the bottom end 104. The bottom taper 458 can cooperate with the lips 114*a,b*,124*a,b* to securely stack multiple insulated boxes 110 on top of one another. The lips 114*a,b*,124*a,b* of a lower insulated box of the stack of insulated boxes can deflect outwards allowing the bottom taper 458 of an upper insulated box to nest between the lips 114*a,b*,124*a,b* and atop the box top 190 of the lower insulated box. By nesting between the lips 114*a,b*,124*a,b*, the lips 114*a,b*,124*a,b* can prevent the upper insulated box from sliding sideways off the top end 102 of the lower insulated box. The insulated boxes 110 can also be conveyable, such as on a conveyor belt, and the insulated boxes 110 can be rigid and strong enough to resist collapse on the conveyor belt.

Figure 5:
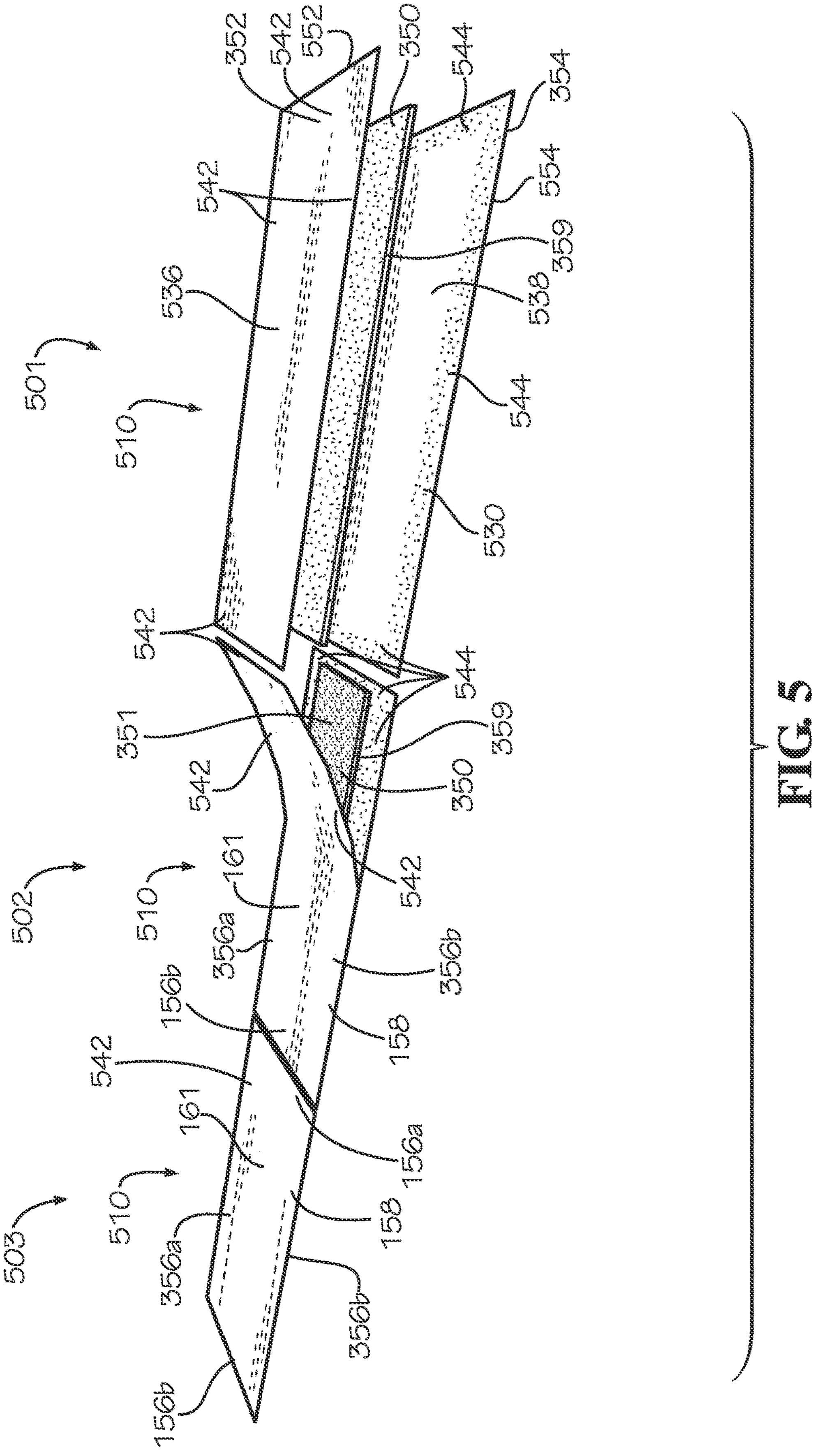
FIG. 5 is a perspective view of a method for manufacturing an insulated panel in accordance with another aspect of the current disclosure.

FIG. 5 is a perspective view of a method of manufacturing for an insulated panel 510. The method can apply to the manufacture of the insulated panels 130*a-d*,140,430. In a step 501, the insulation batt 350 can be positioned between the first sheet 352 and the second sheet 354. The first sheet 352 and the second sheet 354 can be sized and shaped complimentary to each other; however in some aspects, the sheets 352,354 can differ in size and shape. The insulation batt 350 and the sheets 352,354 can each be flat and substantially planar before assembly. In the present aspect, the insulation batt 350 can be approximately 3/8" thick; however this thickness is not limiting. The thickness can range from 1/16" to over 2" with a preferred range of 1/4" to 1/2".

The first sheet 352 can define a first outer edge 552, and a portion of the first sheet 352 proximate the first outer edge 552 can define a first perimeter portion 542. The second sheet 354 can define a second outer edge 554, and a portion of the second sheet 354 proximate the second outer edge 554 can define a second perimeter portion 544. The sheets 352,354 can be sized to overhang the insulation batt 350 on all sides with the first perimeter portion 542 and the second perimeter portion 544 extending beyond the perimeter 359 of the insulation batt 350. The first perimeter portion 542 can encompass a first interior portion 536 of the first sheet 352, and the second perimeter portion 544 can encompass a second interior portion 538 of the second sheet 354. The interior portions 536,538 can be sized and shaped complimentary to the insulation batt 350.

Surfaces of the sheets 352,354 facing one another can be treated with an adhesive 530 such as a cohesive. In various aspects, the adhesive can be a glue, epoxy, cement, double-sided tape, or other suitable adhesive. The surfaces can be entirely treated with the adhesive 530 or selectively treated with the adhesive 530. In the aspect shown, the perimeter portions 542,544 can be selectively treated with the adhesive 530. In some aspects, the insulation batt 350 can also be adhered to the interior portions 536,538 of the sheets 352, 354.

In a step 502, the sheets 352,354 can be aligned and positioned in facing engagement wherein the first perimeter portion 542 can be attached to the second perimeter portion 544 by the adhesive 530. The insulation batt 350 can be aligned between the interior portions 536,538. Attaching the perimeter portions 542,544 can form the border 158 of the insulated panel 510 around the perimeter 359 of the insulation batt 350. As depicted in step 502, the bottom seam 156*b* has been formed, the first side seam 356*a* and the second side seam 356*b* are partially formed, and the top seam 156*a* is yet to be formed.

The border 158 can seal the insulation batt 350 within the panel cavity 351 defined between the interior portions 536,538 of the sheets 352,354, respectively. Portions of the insulated panel 510 containing the insulation batt 350 can define the insulated portion 161 of the insulated panel 510. In some aspects, the insulation batt 350 can be aligned off-center from the sheets 352,354 wherein the border 158 can extend outwards further in some areas than others. In some aspects, the first side seam 356*a*, the second side seam 356*b*, the bottom seam 156*b*, and the top seam 156*a* can define different widths from one another. For example and without limitation, the first side seam 356*a* can extend outwards from the insulation batt 350 further than the bottom seam 156*b* or vice versa.

In a step 503, the first perimeter portion 542 has been fully attached to the second perimeter portion 544, thereby forming the completed border 158. Each of the first side seam 356*a*, the second side seam 356*b*, the bottom seam 156*b*, and the top seam 156*a* are fully formed. Manufacturing of the insulated panel 510 is thus completed; however in some aspects, the method can comprise additional steps such as cutting slots into the border 158. The border 158 can fully encapsulate the insulation batt 350 within the panel cavity 351; however in some aspects, the insulation batt 350 may not be fully encapsulated. In some aspects, the insulation batt 350 can define a complex shape which can comprise curves, notches, cutouts, or other features which can be reflected by complimentary shapes of the border 158 and the insulated portion 161.

In other aspects, the border 158 may not fully encompass and encapsulate the insulation batt 350. In some aspects, some portions of the perimeter 359 may be exposed at an unfinished side or a cutout of the border 158. In some aspects, the insulated panel 510 may not define the border 158 on any portion of the perimeter of the insulated panel 510, and the entire perimeter can define an unfinished edge. In such aspects, the insulated panel 510 can comprise pre-laminated paper and each of the sheets 352,354 can be attached in facing contact with the insulation batt 350 with, for example and without limitation, an adhesive. In some aspects in which the insulated panel 510 defines the border 158, the insulation batt 350 can also be attached in facing contact with one or both of the sheets 352,354. In some aspects, the pre-laminated paper can be provided in a roll, and the insulated panels 510 can be cut to size from the roll. In other aspects, the first sheet 352 and the second sheet 354 can be halves of a single sheet (not shown) which can be folded substantially in half. In such aspects, the insulation batt 350 can be encapsulated between the two halves of the single sheet. In other aspects, the second sheet 354 can be a board (not shown), such as a piece of cardboard, and the insulation batt 350 can be encapsulated between the first sheet 352 and the board.

Figure 6A:
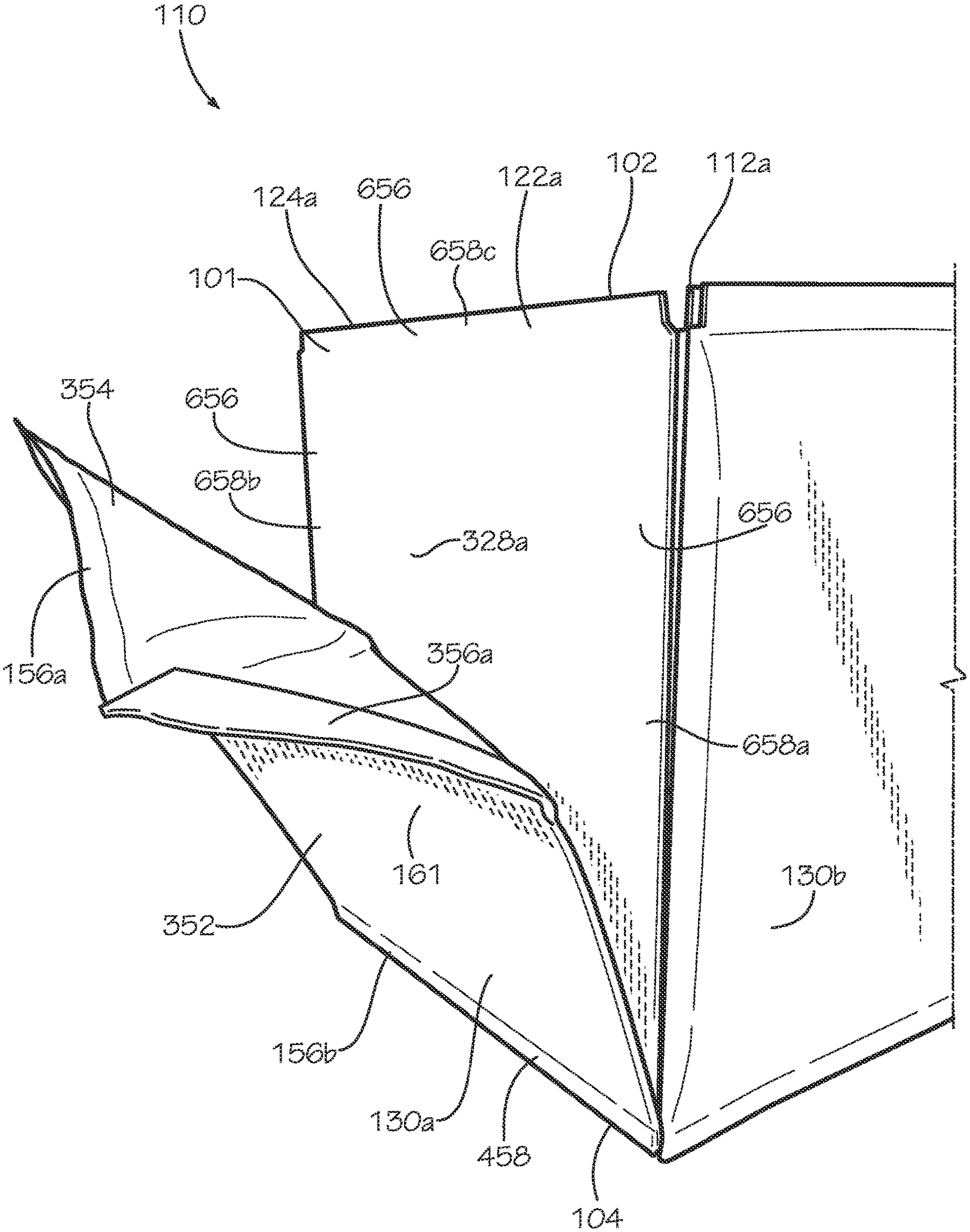
FIG. 6A is a perspective view of another aspect of an insulated panel in accordance with another aspect of the current disclosure prepared for installation on a box of the insulated box of FIG. 1.
Figure 6B:
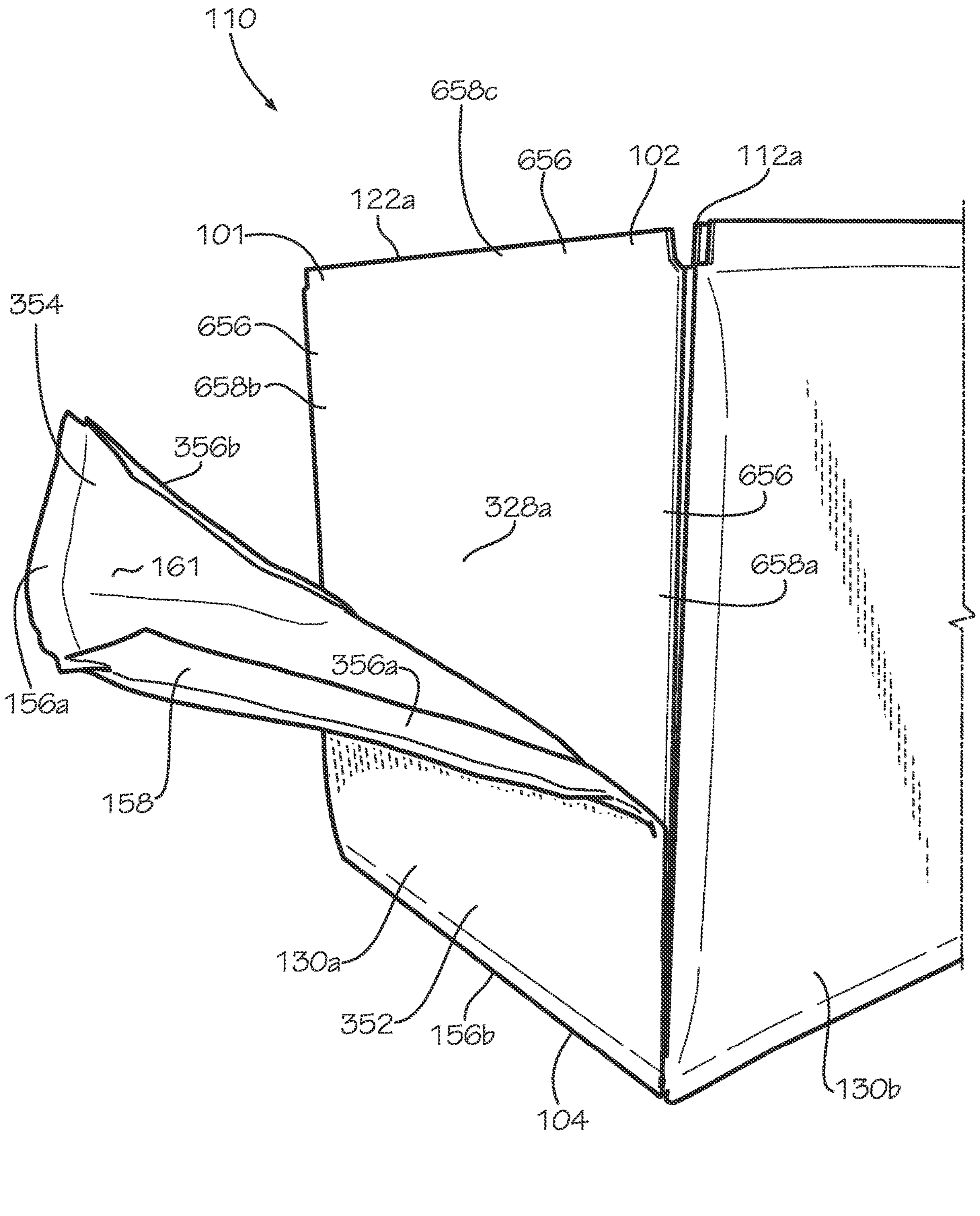
FIG. 6B is a perspective view of the insulated panel of FIG. 6A partially installed on the box of FIG. 6A.
Figure 6C:
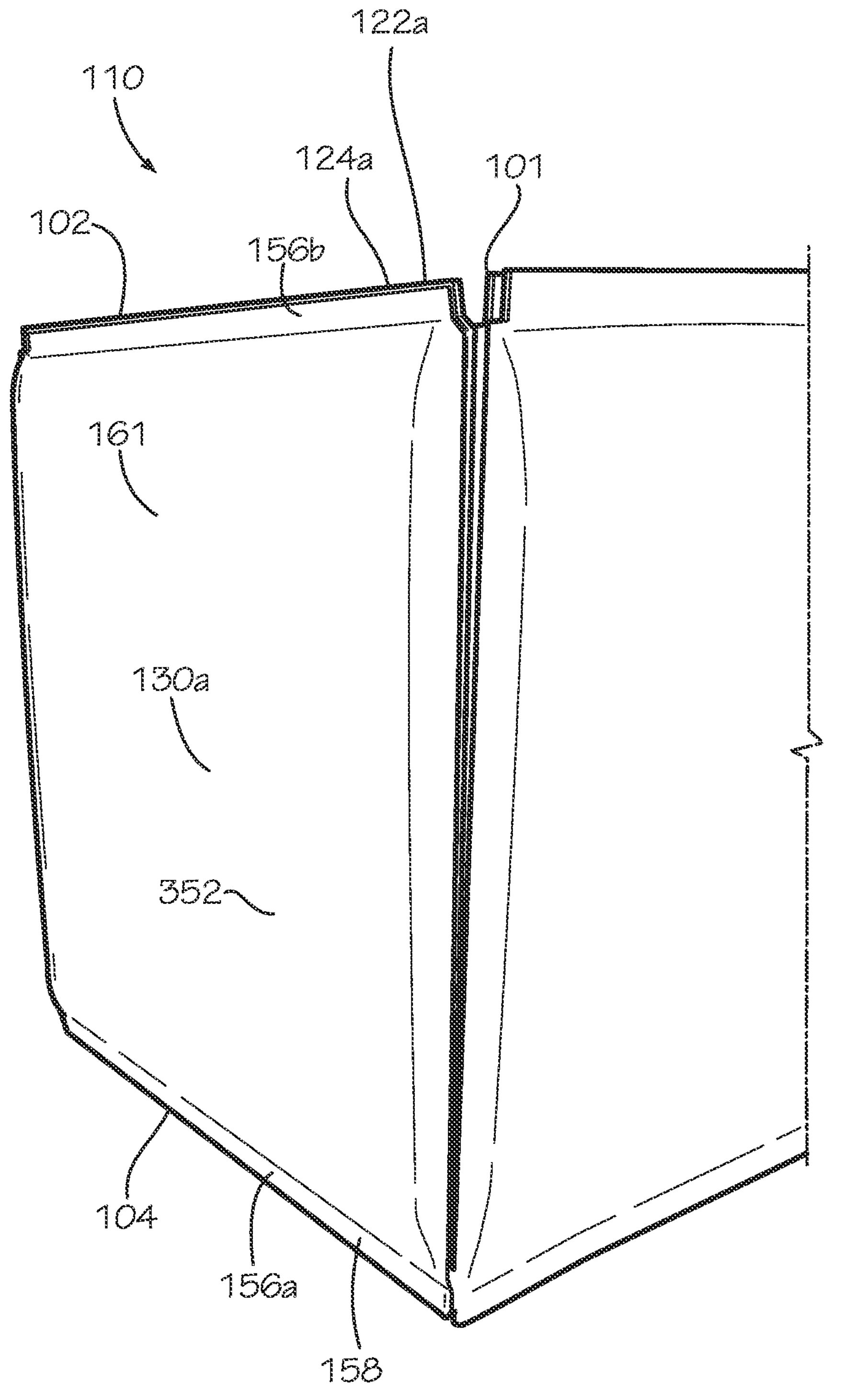
FIG. 6C is a perspective view of the insulated panel of FIG. 6A completely installed on the insulated box of FIG. 6A.

FIGS. 6A-C show perspective views of a method for attaching the insulated panel 130*a* to the side panel 122*a*. In FIG. 6A, the insulated panel 130*a* is shown partially attached to the side panel 122*a*. In the present aspect, the insulated panel 130*a* and the adjacent insulated panel 130*b* can be separate and isolated insulation panels 130 which are not connected together. By using isolated insulated panels 130, manufacturing stress around corners of the insulated box 110 can be reduced during assembly of the insulated box 110, thereby reducing the likelihood of ripping or tearing the insulated panels 130 during assembly. The insulated panel 130*a* can be positioned adjacent to the side panel 122*a*, and the bottom seam 156*b* can be attached to a perimeter area 656 of the outer side surface 328*a*. The perimeter area 656 can extend around the edges of the side panel 122*a*. Specifically, the bottom seam 156*b* can be attached to a bottom portion (not shown) of the perimeter area 656 extending along the bottom end 104 of the side panel 122*a*. The perimeter area 656 can also define a first portion 658*a* and a second portion 658*b* extending upwards from the bottom portion towards a top portion 658*c*. The top portion 658*c* can extend along the lip 124*a* proximate the top end 102 of the side panel 122*a*.

The bottom seam 156*b* of the border 158 can extend outwards from the insulated portion 161 of the insulated panel 130*a*, and the second sheet 354 of the bottom seam 156*b* can be attached to the outer side surface 328*a*. In other aspects, the bottom seam 156*b* can be folded inwards towards the insulation batt 350 (not shown) encapsulated within the insulated portion 161. The bottom seam 156*b* can be attached in facing contact with the side panel 122*a* by an adhesive such as a glue, epoxy, cement, mastic, or any other suitable adhesive. In other aspects, the bottom seam 156*b* can be mechanically attached to the side panel 122*a* such as with a hook-and-loop fastener, stitching, or staples, or other suitable fasteners. In the present aspect, the first side seam 356*a* and the second side seam 356*b* (shown in FIG. 6B) can be folded inwards towards the insulation batt 350 (not shown) encapsulated within the insulated portion 161. The first side seam 356*a* can be attached to the bottom portion (not shown) at an intersection between the bottom portion and the first portion 658*a* of the perimeter area 656. The second side seam 356*b* can be attached to the bottom portion (not shown) at an intersection between the bottom portion and the second portion 658*b* of the perimeter area 656.

In FIG. 6B, the insulated panel 130*a* is shown with the bottom seam 156*b* attached to the side panel 122*a*, and the first side seam 356*a* and the second side seam 356*b* partially attached to the first portion 658*a* and the second portion 658*b* of the perimeter area 656, respectively. The first sheet 352 of the first side seam 356*a* and the second side seam 356*b* can be attached in facing contact to the perimeter portion 656 of the outer side surface 328*a* by an adhesive such as a glue, epoxy, cement, mastic, double-sided tape, cohesive, or other suitable adhesive. In other aspects, the first sheet 352 of the first side seam 356*a* and the second side seam 356*b* can be mechanically attached to the perimeter portion 656 of the outer side surface 328*a*, such as with a hook-and-loop fastener, stitching, or staples, or other suitable fasteners. In the aspect shown, the insulated panel 130*a* is shown as first attached proximate the bottom end 104 and then subsequently attached upwards along the first side seam 356*a* and the second side seam 356*b* towards the top end 102; however, this sequence and direction of attachment are not limiting. The insulated panel 130*a* can first be attached at the first side seam 356*a*, the second side seam 356*b*, or the top seam 156*a* and further attached in a sideways or downwards direction, or in any other suitable sequence. In some aspects, the second sheet 354 of the insulated portion 161 can also be attached to the outer side surface 328*a* by an adhesive such as a glue, epoxy, cement, mastic, or any other suitable adhesive.

FIG. 6C shows the insulated panel 130*a* completely attached to the side panel 122*a*. The first side seam 356*a* (shown in FIG. 6B) can be completely attached to the first portion 658*a* (shown in FIG. 6B) of the perimeter area 656 (shown in FIG. 6B) from the bottom end 104 to the top end 102. The second side seam 356*b* (shown in FIG. 6B) can be completely attached to the second portion 658*b* (shown in FIG. 6B) of the perimeter area 656 (shown in FIG. 6B) from the bottom end 104 to the top end 102. The top seam 156*a* can be fully attached to the top portion 658*c* (shown in FIG. 6B) by an adhesive such as a glue, epoxy, cement, mastic, double-sided tape, cohesive, or any other suitable adhesive. In other aspects, the top seam 156*a* can be mechanically attached to the top portion 658*c*, such as with a hook-and-loop fastener, staples, or stitching, or other suitable fasteners.

The method for attaching the insulated panel 130*a* to the side panel 122*a* shown in FIGS. 6A-C can apply to any of the insulated panels 130*a-d*,140 and any of the adjacent panels 112*a,b*,122*a,b*,240. The method can also be used to attach the insulated panels 130*a-d* to an inner surface, such as inner side surfaces 326*a,b*, within the box cavity 206. The method is demonstrated on the assembled box 101, and the method is exemplary and not limiting. The various panels 112*a,b*,122*a,b*,306 of the box 101 can be clad with insulated panels 130*a-d* prior to assembly of the box 101. For example, the insulated panels 130*a-d*, can be attached to the respective panels 112*a,b*,122*a,b* of an unfolded box blank 710 (shown in FIG. 7). It can be desirable to attach the insulated panels 130*a-d* to the unfolded box blank 710 prior to assembly in order to reduce mechanical handling of the box 101.

Figure 7:
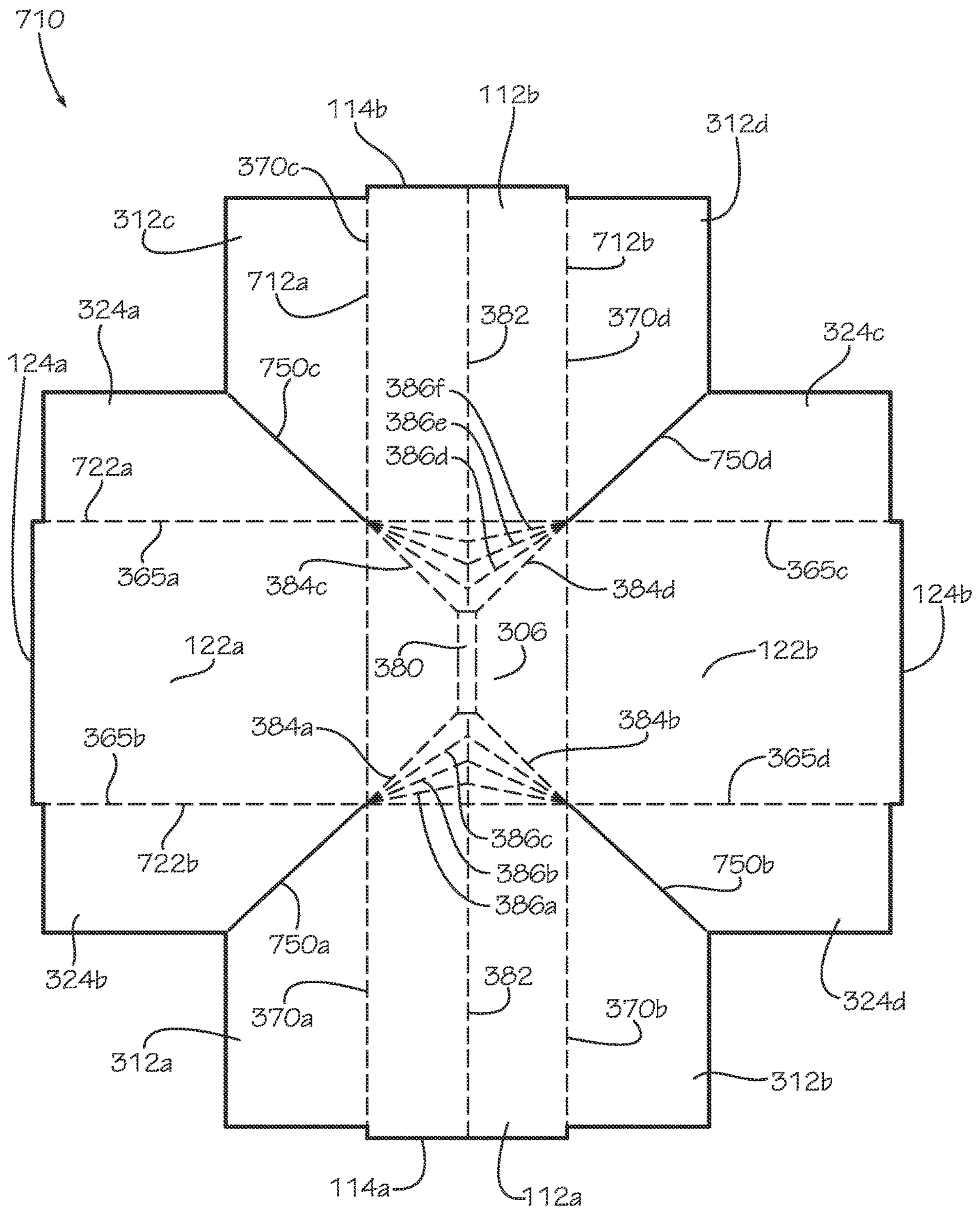
FIG. 7 is a top view of a box blank of the box of FIG. 6A.

FIG. 7 is a top view of the box blank 710 which can be assembled to form the box 101 of the insulated box 110. The box blank 710 can further define four corner cuts 750*a-d*. In other aspects, the box blank 710 can define fold lines or scored lines in place of the corner cuts 750*a-d*. A first corner cut 750*a* can extend outwards from the bottom panel 306 to separate the first wing 312*a* from the second wing 324*b*. A second corner cut 750*b* can extend outwards from the bottom panel 306 to separate the first wing 312*b* from the second wing 324*d*. A third corner cut 750*c* can extend outwards from the bottom panel 306 to separate the first wing 312*c* from the second wing 324*a*. A fourth corner cut 750*d* can extend outwards from the bottom panel 306 to separate the first wing 312*d* from the second wing 324*c*. In other aspects, the corner cuts 750*a-d* can be creases instead of cuts, and the adjacent wings 312*a-d*,324*a-d* can be hingedly connected by the corner cuts 750*a-d*.

The box blank 710 can define a first length fold line 712*a* and a second length fold line 712*b* extending from the side panel 112*a* to the side panel 112*b*. The first length fold line 712*a* can facilitate folding of the first wing 312*a* relative to the side panel 112*a*, the side panel 122*a* relative to the bottom panel 306, and the first wing 312*c* relative to the second side panel 112*b*. The second length fold line 712*b* can facilitate folding of the first wing 312*b* relative to the side panel 112*a*, the side panel 122*b* relative to the bottom panel 306, and the first wing 312*d* relative to the side panel 112*b*.

The box blank 710 can further define a first width fold line 722*a* and a second width fold line 722*b*. The width fold lines 722*a,b* can be defined substantially perpendicular to the length fold lines 712*a,b*. The first width fold line 722*a* can facilitate folding of the second wing 324*a* relative to the side panel 122*a*, the side panel 112*b* relative to the bottom panel 306, and the second wing 324*c* relative to the side panel 122*b*. The second width fold line 722*b* can facilitate folding of the second wing 324*b* relative to the side panel 122*a*, the side panel 112*a* relative to the bottom panel 306, and the second wing 324*d* relative to the side panel 122*b*.

The center fold line 382 can extend across and bisect each side panel 112*a,b*. The center fold line 382 facilitates each of the side panels 112*a,b* folding inwards about the center fold line 382 and towards the bottom panel 306 to facilitate collapsing the insulated box 110 as shown in FIG. 8.

In some aspects, the insulated panels 130*a-d* can be attached to the side panels 112*a,b*,122*a,b* to the unfolded box blank 710 prior to assembly. In other aspects, a single insulated panel 130*a,b* can be attached to the unfolded box blank 710 to cover the side panels 112*a,b*,122*a,b*, and in some aspects, the bottom panel 306 as well. In some aspects, the entire unfolded box blank 710 can be covered by a single insulated panel.

Figure 8:
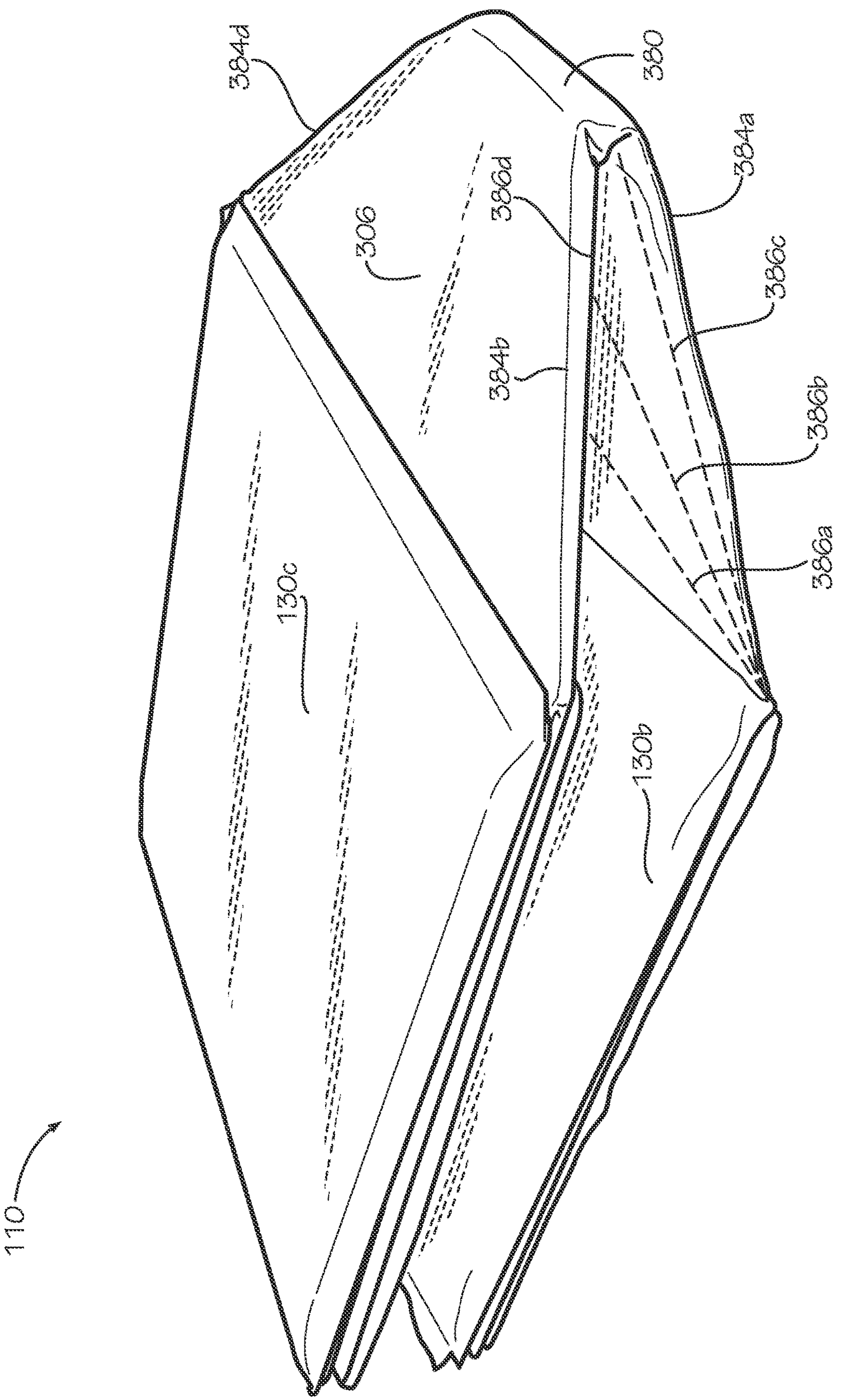
FIG. 8 is a perspective view of the insulated box of FIG. 1 in a collapsed configuration.

FIG. 8 is a perspective view of the insulated box 110 of FIG. 1 in a collapsed configuration. In the present view, the carrying accessory 170 is removed to better show the details of the bottom panel 306. As the insulated box 110 collapses, the side panels 122*a,b* (side panels 122*a,b* shown in FIG. 1) move inwards together and towards one another, and the side panels 112*a,b* fold inwards towards one another (side panels 112*a,b* shown in FIG. 1). The V-shaped fold lines 386*a-f* (V-shaped fold lines 386*e,f* shown in FIG. 7) cooperate to transition the bottom panel 306 from a substantially planar shape to the truncated pyramidal shape. In the truncated pyramidal shape, the center subpanel 380 extends outwards and away from the side panels 112*a,b* and the side panels 122*a,b* (shown in FIG. 7). Exerting a force upon the center subpanel 380, such as by pushing the box 101 against the ground can cause the insulated box 110 to self-expand into an expanded configuration (shown in FIG. 1) with a substantially rectangular prism shape. The self-expanding action can be desirable to allow for quick and easy reconfiguration of the insulated box 110, unlike many boxes which must be folded and taped together. The insulated boxes 110 can be shipped and stored in the collapsed configuration for space-efficient packing, and a user can simply press upon the center subpanel 380, such as by pressing the center subpanel 380 against the ground, and the insulated box 110 can reconfigure to the expanded configuration.

Figure 9:
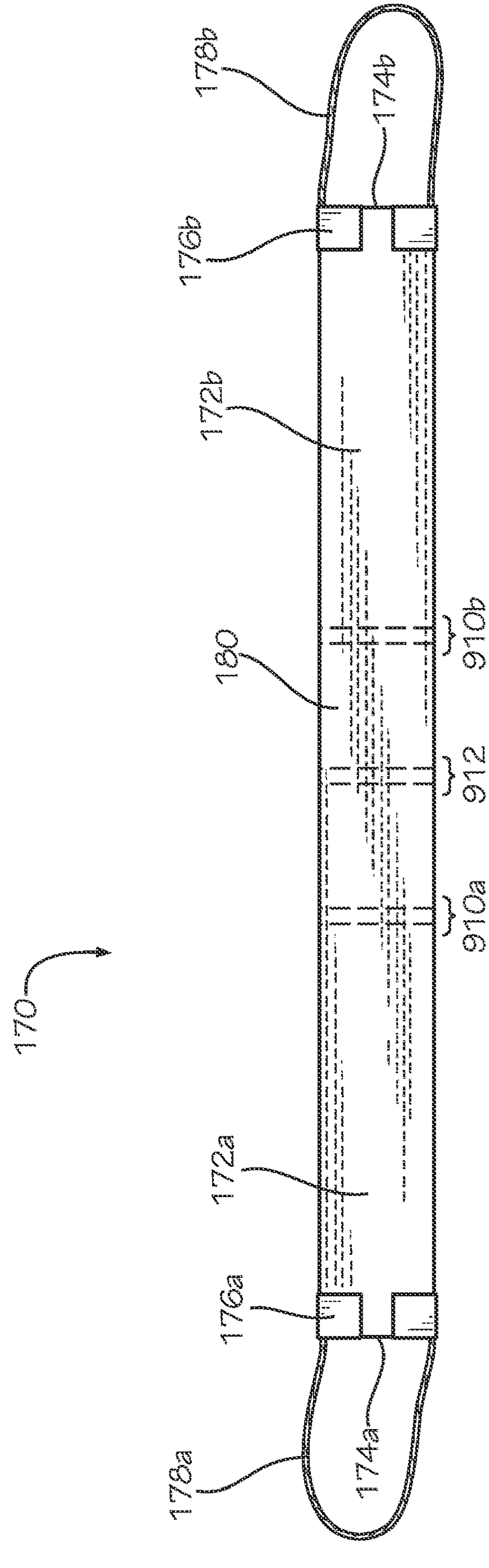
FIG. 9 is a top view of the carrying accessory of the insulated box assembly of FIG. 1.

FIG. 9 is a top view of the carrying accessory 170 of FIG. 1. As previously described, the carrying accessory 170 can be configured to extend beneath the insulated box 110 (shown in FIG. 1) to facilitate hand carrying of the insulated box 110. The carrying accessory 170 can define two pairs of fold lines 910*a,b*. A first pair of fold lines 910*a* can be defined between the first side portion 172*a* and the middle portion 180, and a second pair of fold lines 910*b* can be defined between the second side portion 172*b* and the middle portion 180. The fold lines of each pair of fold lines 910*a,b* can be placed closely together, such as an inch apart or less, and can be substantially parallel to one another. The pairs of fold lines 910*a,b* configure the carrying accessory

170 to closely conform to the bottom taper 458 (shown in FIG. 3) of the bottom end 104 of the insulated box 110. The middle portion 180 of the carrying accessory 170 can also define a pair of middle fold lines 912. The middle fold lines 912 can configure the carrying accessory 170 to closely conform to the truncated pyramidal shape of the bottom panel 306 (shown in FIG. 8) when the insulated box 110 is in the collapsed configuration as shown in FIG. 8. In other aspects each or any of the pairs of fold lines 910*a,b* and 912 can be substituted with single fold lines as desired.

Figure 10:
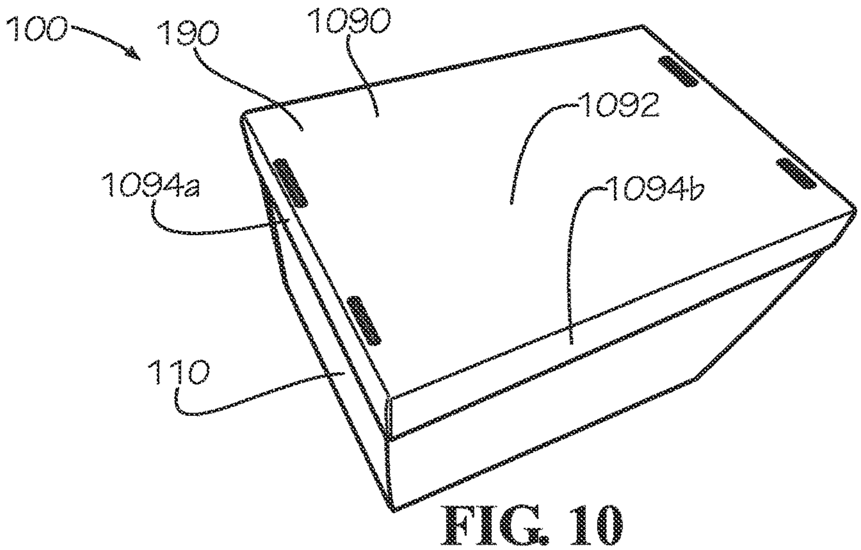
FIG. 10 is a perspective view of the insulated box assembly comprising the insulated box of FIG. 1 and another aspect of a box top in accordance with another aspect of the present disclosure.

FIG. 10 is a perspective view of the insulated box assembly 100 comprising the insulated box 110 of FIG. 1 and another aspect of a box top 190 in accordance with another aspect of the present disclosure. In the present aspect, the box top 190 can be a tray top 1090. The tray top 1090 can comprise a top panel 1092 and four side panels, as represented by side panels 1094*a,b*, extending down from the top panel 1092. The tray top 1090 can be configured to fit over the top end 102 of the box 101 (shown in FIG. 1). The side panels 1094 can fit over the lips 114*a,b*,124*a,b* (shown in FIG. 1) to enclose the box cavity 206 (shown in FIG. 2).

Figure 11:
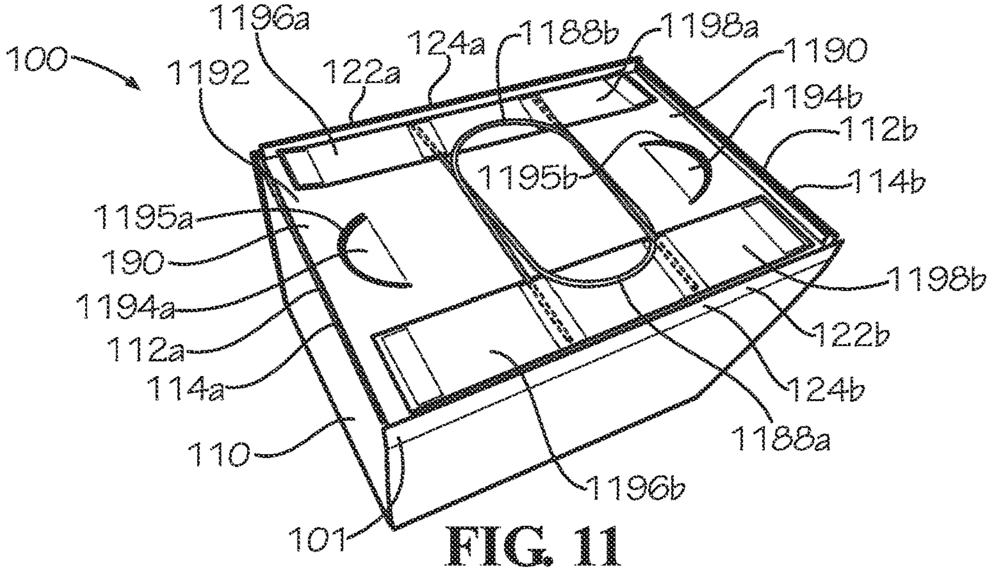
FIG. 11 is a perspective view of the insulated box assembly comprising the insulated box of FIG. 1 and another aspect of a box top in accordance with another aspect of the present disclosure.

FIG. 11 is a perspective view of the insulated box assembly 100 comprising the insulated box 110 of FIG. 1 and another aspect of a box top 190 in accordance with another aspect of the present disclosure. In the present aspect, the box top 190 can be a handle panel 1190. The handle top 1190 can comprise a top panel 1192 and a pair of side panels 1196*a,b* attached at opposite sides of the top panel 1192. In the present aspect, the top panel 1192 can be positioned between the lips 114*a,b*,124*a,b* of the box 101, and the side panels 1196*a,b* can be positioned adjacent to the side panels 124*a,b*. The side panels 1196*a,b* can be hingedly attached to the top panel 1192. The handle top 1190 can further comprise a pair of side tabs (not shown) which can be attached to the top panel 1192 and which can extend downwards into the box cavity 206 (shown in FIG. 2), adjacent to the side panels 112*a,b*. In some aspects, the side tabs of the handle top 1190 can be glued to either the inside or the outside of the side panels 112*a,b* to secure the handle top 1190 to the insulated box 110. In other aspects, the handle top 1190 can be secured to the insulated box 110 by tape, banding, a strap, or other restraint mechanism.

A handle loop 1188*a,b* can be attached to each side panel 1196*a,b*, respectively, by a tape strip 1198*a,b*. In the present aspect, the tape strips 1198*a,b* can extend completely around the respective side panel 1196*a,b* to secure the handle loop 1188*a,b* to the side panel 1196*a,b*. In the present aspect, the handle loops 1188*a,b* can be rope loops. The handle loops 1188*a,b* can allow a user to carry the insulated box assembly 100.

In the present aspect, the top panel 1192 can further comprise a pair of folding tabs 1194*a,b*. The folding tabs 1194*a,b* can cover a pair of hand holes 1195*a,b*, respectively. The folding tabs 1194*a,b* can be hingedly attached to the top panel 1192, and the folding tabs 1194*a,b* can be pressed inwards towards the box cavity 206. With the folding tabs 1194*a,b* pressed inwards, a user can put a finger or fingers through each of the hand holes 1195*a,b* to pick up the insulated box assembly 100. In some aspects, the hand holes 1195*a,b* can be positioned close enough together that a user can insert a thumb through a first of the hand holes 1195*a,b* and a finger through the second of the hand holes 1195*a,b* to pick up the insulated box assembly 100 with one hand. In some aspects, the handle top 1190 can comprise the handle loops 1188*a,b* but may not comprise the folding tabs 1194*a,b* or define the hand holes 1195*a,b*. In other aspects, the handle top 1190 can comprise the folding tabs 1194*a,b* and define the hand holes 1195*a,b* but may not comprise the handle loops 1188*a,b*.

Figure 12:
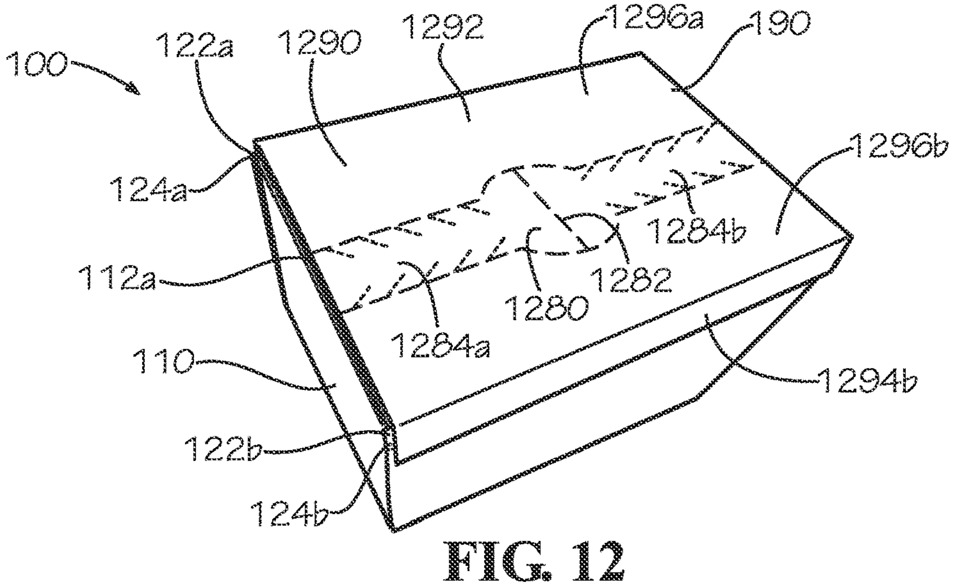
FIG. 12 is a perspective view of the insulated box assembly comprising the insulated box of FIG. 1 and another aspect of a box top in accordance with another aspect of the present disclosure.

FIG. 12 is a perspective view of the insulated box assembly 100 comprising the insulated box 110 of FIG. 1 and another aspect of a box top 190 in accordance with another aspect of the present disclosure. The box top 190 can be a zipper top 1290. The zipper top 1290 can comprise a top panel 1292 and a pair of side panels 1294, as represented by the side panel 1294*b*. The side panels 1294 can be hingedly attached to the top panel 1292. In the present aspect, the side panels 1294 can overlaps the lips 124*a,b* of the side panels 122*a,b* of the insulated box 110. The side panels 1294 can be attached to the side panels 122*a,b* by an adhesive, such as a glue, mastic, epoxy, cement, double-sided tape, or any other suitable material. In the present aspect, a strip of adhesive (not shown) can be covered by a backing strip (not shown), and the backing strip can be removed to adhere the side panels 1294 to the side panels 122*a,b*. The zipper top 1290 can further comprise a pair of tabs (not shown) which can be inserted into the box cavity 206 (shown in FIG. 2) and positioned adjacent to the side panels 112*a,b* (side panel 112*b* shown in FIG. 1). In other aspects, the tabs can be disposed external to the side panels 112*a,b*, similar to the side panels 1294. The tabs can be attached to the side panels 112*a,b* by the adhesive or the adhesive strip, and the tabs can seal the box cavity 206.

The top panel 1292 can define a zipper 1280 which can be defined by a perforations extending around the zipper 1280. The zipper 1280 can extend across the top panel 1292 and divide the top panel 1292 into a first top panel portion 1296*a* and a second top panel portion 1296*b*. The zipper 1280 can be divided into a first zipper portion 1284*a* and a second zipper portion 1284*b* by a center perforation line 1282. A user can press inwards on the center perforation line 1282 to separate the first zipper portion 1284*a* from the second zipper portion 1284*b*. Each zipper portion 1284*a,b* can then be ripped out of the top panel 1292 along the perforations, thereby detaching the first top panel portion 1296*a* from the second top panel portion 1296*b*. With the top panel portions 1296*a,b* detached, the top panel 1292 can be opened to allow access to contents within the box cavity 206.

In the present aspect, the sheets 352,354 can comprise paper, such as kraft paper; however, in other embodiments, the sheets can comprise posterboard, cardboard, plastic sheeting, cellulose film, cloth, or any other suitable material. In some aspects, the sheets can comprise a water-proof or water-resistant material, such as water-proof paper. In some aspects, a one of the sheets 352,354 of the insulated box assembly 100 can comprised a material different from another of the sheets 352,354. In the present aspect, the box 101 can comprise a paper fiber-based material such as corrugated cardboard or poster board; however, the box 101 can be comprised of any suitable rigid board material such as wood, plastic, metal, or any other material.

The insulation batts 350 can comprise paper or other paper fiber materials; however, in other aspects, the insulation batts can comprise cotton, foam, rubber, plastics, fiberglass, mineral wool, or any other flexible insulation material. In the present application, the insulation batts can be repulpable. In the present aspect, the insulated box assembly 100 can be 100% recyclable. In the present aspect, the insulated box assembly 100 can be single-stream recyclable wherein all materials comprised by the insulated box assembly 100 can be recycled by a single processing train without requiring separation of any materials or components of the insulated box assembly 100. In the present aspect, the insulated box assembly 100 can be compostable. In the present aspect, the insulated box assembly 100 can be repulpable. In the present aspect, insulated box assembly 100 and each of the insulated box 110 and the insulated panels 130*a-d*,430,140,510 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL which is hereby incorporated in its entirety. In the present aspect, insulated box assembly 100 and each of the insulated box 110 and the insulated panels 130*a-d*,430,140,510 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437,365, filed Dec. 21, 2016, which are each incorporated by reference in their entirety herein.

The insulated box assembly 100 can be used in applications in which a user or mail carrier transports perishable or temperature-sensitive goods. For example and without limitation, the insulated box assembly 100 can be used to transport groceries. The insulated box assembly 100 can improve upon a common cardboard box by providing insulation to prevent spoilage of the contents.

In order to ship temperature-sensitive goods, common cardboard boxes are often packed with insulating materials made of plastics or foams which are not accepted by many recycling facilities or curb-side recycling programs in which a waste management service collects recyclables at a user's home. Consequently, shipping temperature-sensitive goods often produces non-recyclable waste which is deposited in landfills. The insulation materials often decompose very slowly, sometimes over the course of several centuries. In some instances, non-recyclable and non-biodegradable insulating materials can enter the oceans where the insulation materials can remain for years and harm marine life. In some aspects, the insulated box assembly 100 can reduce waste and pollution by comprising materials which are recyclable or biodegradable. In aspects in which the insulated box assembly 100 is curb-side or single-stream recyclable, the user may be more likely to recycle the insulated box assembly 100 due to the ease of curb-side collection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An insulated box assembly comprising:

an insulated box comprising:

a box comprising:

a bottom panel;

a first side panel;

a second side panel, the first side panel and the second side panel attached to the bottom panel, the box defining a box opening of a box cavity disposed opposite from the bottom panel;

a first shoulder disposed proximate the box opening and extending inward into the box cavity from the first side panel;

a second shoulder disposed proximate the box opening and extending inward into the box cavity from the second side panel;

a first insulated panel attached to the first side panel, the first insulated panel comprising an insulation batt and a sheet, the insulation batt enclosed between the first side panel and the sheet;

a second insulated panel attached to the second side panel and attached to the bottom panel opposite from the first side panel; and a box top panel enclosing the box cavity at a top end of the box; the box top panel resting upon the first shoulder and the second shoulder; and an insulated cavity panel, the insulated cavity panel attached to the side panel and disposed within the box cavity, the insulated cavity panel comprising a cavity sheet and a cavity insulation batt, the cavity sheet encapsulating the cavity insulation batt.

2. The insulated box assembly of claim 1, wherein:

the first side panel defines a lip and a bottom taper;

the lip is disposed opposite from the bottom taper; and the lip is configured to receive another bottom taper of another insulated box.

3. The insulated box assembly of claim 1, wherein:

the sheet is a first sheet;

the first insulated panel further comprises a second sheet; and the insulation batt is disposed within a panel cavity defined between the first sheet and the second sheet.

4. The insulated box assembly of claim 1, wherein:

the box cavity defines a horizontal cross-section;

the horizontal cross-section is defined substantially parallel to the bottom panel; and the insulated cavity panel is sized complimentary to the horizontal cross-section.

5. The insulated box assembly of claim 1, further comprising a carrying accessory, wherein:

the carrying accessory defines a first side portion and a second side portion disposed opposite from the first side portion;

the carrying accessory defines a middle portion disposed between the first side portion and the second side portion;

the middle portion extends beneath the bottom panel;

the first side portion extends upwards from the middle portion and adjacent to the first insulated panel;

the second side portion extends upwards from the middle portion and adjacent to the second insulated panel; and the first side portion and the second side portion each define a handle.

* * * * *